(12) United States Patent
Kawano et al.

(10) Patent No.: US 12,414,145 B2
(45) Date of Patent: Sep. 9, 2025

(54) TERMINAL APPARATUS, METHOD, AND INTEGRATED CIRCUIT

(71) Applicant: SHARP KABUSHIKI KAISHA, Sakai (JP)

(72) Inventors: Takuma Kawano, Sakai (JP); Shohei Yamada, Sakai (JP); Hidekazu Tsuboi, Sakai (JP); Kyosuke Inoue, Sakai (JP); Taichi Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 436 days.

(21) Appl. No.: 18/109,602

(22) Filed: Feb. 14, 2023

(65) Prior Publication Data

US 2024/0147516 A1    May 2, 2024

(30) Foreign Application Priority Data

Nov. 1, 2022   (JP) .................................. 2022-175771

(51) Int. Cl.
  *H04W 72/542* (2023.01)
  *H04W 24/08* (2009.01)
  *H04W 88/04* (2009.01)

(52) U.S. Cl.
  CPC ......... *H04W 72/542* (2023.01); *H04W 24/08* (2013.01); *H04W 88/04* (2013.01)

(58) Field of Classification Search
  CPC ............................ H04W 72/542; H04W 24/08
  See application file for complete search history.

(56) References Cited

U.S. PATENT DOCUMENTS

2023/0101557 A1*  3/2023  Wu ..................... H04W 68/005
                                                                    370/315

OTHER PUBLICATIONS

3GPP TS 38.331 V17.2.0 (Sep. 2022) 3rd Generation Partnership Project; Technical Specification Group Radio Access Network; NR; Radio Resource Control (RRC) protocol specification (Release 17).
3GPP TS 38.321 V17.0.0 (Mar. 2022) 3rd Generation Partnership Project; Technical Specification Group Radio Access Network; NR; Medium Access Control (MAC) protocol specification (Release 17).

(Continued)

*Primary Examiner* — Won Tae C Kim
(74) *Attorney, Agent, or Firm* — ScienBiziP, P.C.

(57) ABSTRACT

A terminal apparatus for communicating with a first terminal apparatus and a second terminal apparatus is responsible to relay communication between the first terminal apparatus and the second terminal apparatus. The terminal apparatus measures a sidelink Reference Signal Received Power (SL-RSRP) in each of communication with the first terminal apparatus and communication with the second terminal apparatus, and determines whether the two SL-RSRPs are equal to or greater than a threshold and notifies the first terminal apparatus that the first terminal apparatus and the second terminal apparatus are in proximity in a case that the two SL-RSRPs are determined to be equal to or greater than the threshold, and does not notify the first terminal apparatus that the first terminal apparatus and the second terminal apparatus are in proximity in a case that the two SL-RSRPs are not determined to be equal to or greater than the threshold.

3 Claims, 8 Drawing Sheets

(56) References Cited

OTHER PUBLICATIONS

3GPP TS 38.212 V17.2.0 (Jun. 2022) 3rd Generation Partnership Project; Technical Specification Group Radio Access Network; NR; Multiplexing and channel coding (Release 17).
3GPP TS 38.214 V17.2.0 (Jun. 2022) 3rd Generation Partnership Project; Technical Specification Group Radio Access Network; NR; Physical layer procedures for data (Release 17).
3GPP TS 23.304 V17.2.1 (Mar. 2022) 3rd Generation Partnership Project; Technical Specification Group Services and System Aspects; Proximity based Services (ProSe) in the 5G System (5GS) (Release 17).
3GPP TS 38.300 V17.1.0 (Jun. 2022) 3rd Generation Partnership Project; Technical Specification Group Radio Access Network; NR; NR and NG-RAN Overall Description; Stage 2 (Release 17).
Kyocera, "Relay reselection based on discovery", R2-2100707, 3GPP TSG-RAN WG2 # 113-e, Online, Jan. 25, 2021-Feb. 5, 2021, (Jan. 15, 2021).

* cited by examiner

TERMINAL APPARATUS, METHOD, AND INTEGRATED CIRCUIT

TECHNICAL FIELD

The present invention relates to a terminal apparatus, a method, and an integrated circuit.

BACKGROUND ART

In the 3rd Generation Partnership Project (3GPP) being a standardization project for cellular mobile communication systems, technical study and standardization have been carried out on the cellular mobile communication systems including radio access, core networks, services, and the like.

For example, in 3GPP, technical study and standardization have been started on Evolved Universal Terrestrial Radio Access (E-UTRA) as a radio access technology (RAT) for cellular mobile communication systems for the 3.9th generation and the 4th generation. At present as well, in 3GPP, technical study and the standardization have been carried out on enhanced technology of E-UTRA. Note that E-UTRA may also be referred to as Long Term Evolution (LTE: trade name), and its enhanced technology may also be referred to as LTE-Advanced (LTE-A) and LTE-Advanced Pro (LTE-A Pro).

In 3GPP, technical study and standardization have been started on New Radio or NR Radio access (NR) as a radio access technology (RAT) for cellular mobile communication systems for the 5th generation (5G). At present as well, in 3GPP, technical study and the standardization have been carried out on enhanced technology of NR.

CITATION LIST

Non Patent Literature

NPL 1: 3GPP TS 38.331 v17.2.0, "NR; Radio Resource Control (RRC); Protocol specifications" pp 27-59, pp 278-326, pp 332-1158

NPL 2: 3GPP TS 38.321 v17.0.0, "NR; Medium Access Control (MAC) protocol specification" pp 17-104, pp 113-142, pp 145-232

NPL 3: 3GPP TS 38.212 v17.2.0, "NR; Multiplexing and channel coding"

NPL 4: 3GPP TS 38.214 v17.2.0, "NR; Physical layer procedures for data"

NPL 5: 3GPP TS 23.304 v17.2.1, "NR; Proximity based Services (ProSe) in the 5G System (5GS)"

NPL 6: 3GPP TS 38.300 v17.1.0, "NR; NR and NG-RAN Overall Description; Stage 2"

SUMMARY OF INVENTION

Technical Problem

In 3GPP, as an extended technique of NR, a technique called a sidelink is under study in which terminal apparatuses directly communicate with each other without through a core network, and a study has been started on a technique (UE-to-UE relay) in which another terminal apparatus is added between the terminal apparatuses to support communication between the terminal apparatuses.

An aspect of the present invention has been made in light of the foregoing, and an object of the present invention is to provide a terminal apparatus, a base station apparatus, a communication method, and an integrated circuit capable of performing efficient communication control.

Solution to Problem

In order to accomplish the object described above, an aspect of the present invention is contrived to provide the following means. Specifically, an aspect of the present invention is a terminal apparatus for communicating with a first terminal apparatus and a second terminal apparatus, the terminal apparatus being responsible to relay communication between the first terminal apparatus and the second terminal apparatus, the terminal apparatus including: a processing unit configured to measure a sidelink Reference Signal Received Power (SL-RSRP) in each of communication with the first terminal apparatus and communication with the second terminal apparatus; and a transmitter, wherein the processing unit determines whether the two SL-RSRPs each are equal to or greater than a threshold, and notifies the first terminal apparatus that the first terminal apparatus and the second terminal apparatus are in proximity in a case that the two SL-RSRPs are determined to be equal to or greater than the threshold, and does not notify the first terminal apparatus that the first terminal apparatus and the second terminal apparatus are in proximity in a case that the two SL-RSRPs are not determined to be equal to or greater than the threshold.

An aspect of the present invention is a method for a terminal apparatus for communicating with a first terminal apparatus and a second terminal apparatus, the terminal apparatus being responsible to relay communication between the first terminal apparatus and the second terminal apparatus, the method including: measuring a sidelink Reference Signal Received Power (SL-RSRP) in each of communication with the first terminal apparatus and communication with the second terminal apparatus; and determining whether the two SL-RSRPs are equal to or greater than a threshold, and notifying the first terminal apparatus that the first terminal apparatus and the second terminal apparatus are in proximity in a case that the two SL-RSRPs are determined to be equal to or greater than the threshold, and not notifying the first terminal apparatus that the first terminal apparatus and the second terminal apparatus are in proximity in a case that the two SL-RSRPs are not determined to be equal to or greater than the threshold.

An aspect of the present invention is an integrated circuit mounted on a terminal apparatus for communicating with a first terminal apparatus and a second terminal apparatus, the terminal apparatus being responsible to relay communication between the first terminal apparatus and the second terminal apparatus, the integrated circuit performing: measuring a sidelink Reference Signal Received Power (SL-RSRP) in each of communication with the first terminal apparatus and communication with the second terminal apparatus; and determining whether the two SL-RSRPs are equal to or greater than a threshold, and notifying the first terminal apparatus that the first terminal apparatus and the second terminal apparatus are in proximity in a case that the two SL-RSRPs are determined to be equal to or greater than the threshold, and not notifying the first terminal apparatus that the first terminal apparatus and the second terminal apparatus are in proximity in a case that the two SL-RSRPs are not determined to be equal to or greater than the threshold.

Note that these comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, a terminal apparatus, a method, and an integrated circuit can perform efficient communication control processing.

DESCRIPTION OF EMBODIMENTS

The present embodiment will be described below in detail with reference to the drawings.

Note that in the present embodiment, names of nodes and entities and processing in the nodes and entities in a case that a radio access technology is NR will be described, but the present embodiment may be applied to other radio access technologies. The name of each of the nodes or entities in the present embodiment may be a different name.

Figure 1:
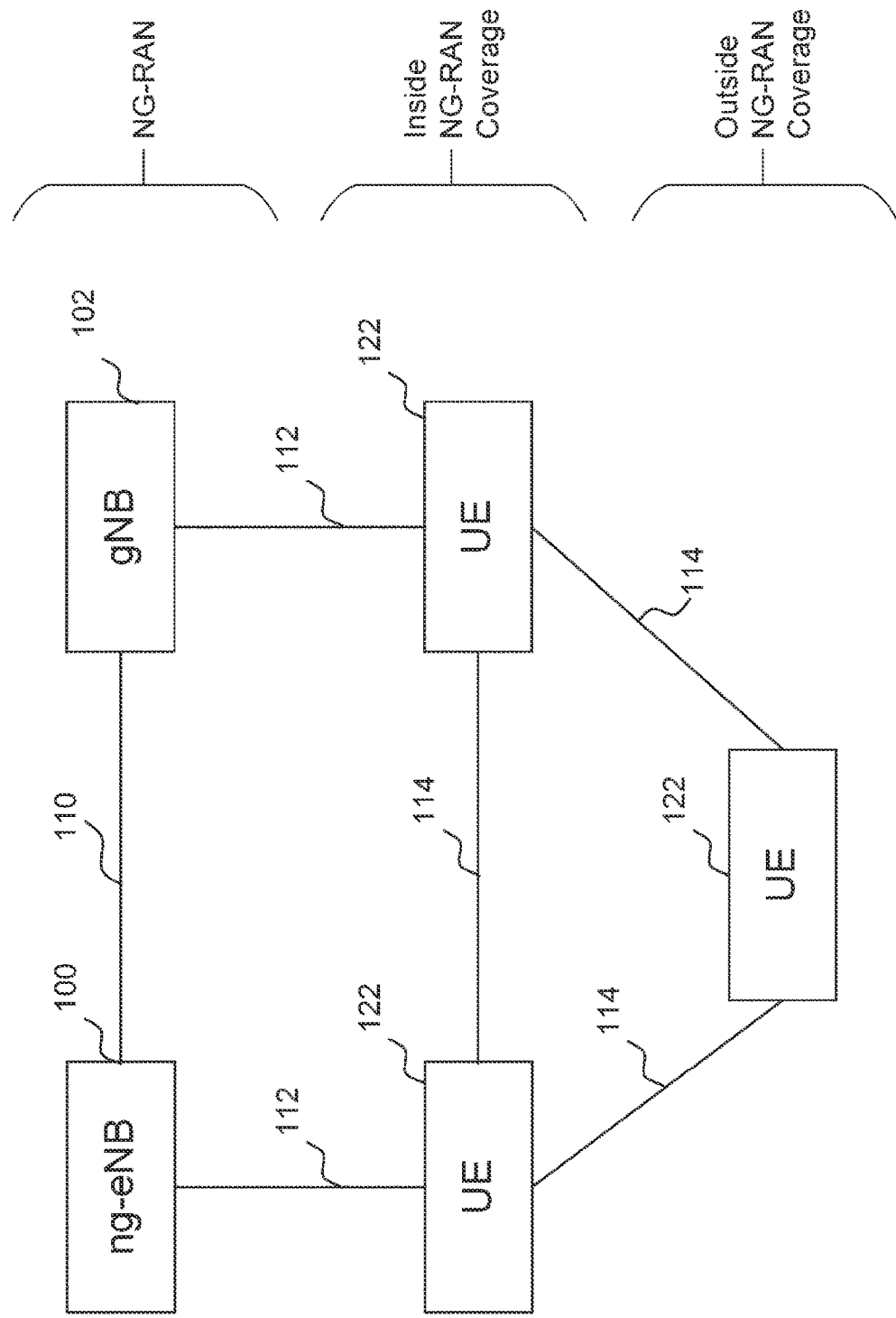
FIG. 1 is a schematic diagram of a communication system according to the present embodiment.

FIG. 1 is a schematic diagram of a communication system according to the present embodiment. Note that functions of nodes, radio access technologies, core networks, interfaces, and the like described with reference to FIG. 1 are some functions closely related to the present embodiment, and other functions may be included.

E-UTRA may be a radio access technology. E-UTRA may be an air interface between a UE 122 and an ng-eNB 100. The air interface 112 between the UE 122 and the ng-eNB 100 may be referred to as a Uu interface. The ng-eNB (ng E-UTRAN Node B) 100 may be a base station apparatus of the E-UTRAN. The ng-eNB 100 may have an E-UTRA protocol described below. The E-UTRA protocol may include an E-UTRA user plane (UP) protocol to be described below and an E-UTRA control plane (CP) protocol to be described below. The ng-eNB 100 may terminate the E-UTRA user plane protocol and the E-UTRA control plane protocol for the UE 122. A radio access network including an eNB may be referred to as an E-UTRAN.

NR may be a radio access technology. NR may be an air interface between the UE 122 and a gNB 102. The air interface 112 between the UE 122 and the gNB 102 may be referred to as a Uu interface. The gNB (g Node B) 102 may be a base station apparatus. The gNB 102 may have an NR protocol described below. The NR protocol may include an NR user plane (UP) protocol to be described below and an NR control plane (CP) protocol to be described below. The gNB 102 may terminate the NR user plane protocol and the NR control plane protocol for the UE 122.

Note that an interface 110 between the ng-eNB 100 and the gNB 102 may be referred to as an Xn interface. The ng-eNB and the gNB may be connected to a 5GC via an interface called an NG interface (not illustrated). The 5GC may be a core network. One or more base station apparatuses may connect to the 5GC via the NG interface.

A state in which connection to the base station apparatus is possible only via the Uu interface may be referred to as Inside NG-RAN Coverage or In-Coverage (IC). A state in which connection to the base station apparatus only via the Uu interface is not possible may be referred to as Outside NG-RAN Coverage or Out-of-Coverage (OOC). An air interface 114 between a UE 122 and a UE 122 may be referred to as a PC5 interface. Communication between the UEs 122 performed via the PC5 interface may be referred to as sidelink (SL) communication.

Note that, in the following description, the ng-eNB 100 and/or the gNB 102 is simply referred to as a base station apparatus, and the UE 122 is also simply referred to as a terminal apparatus or a UE. The PC5 interface is also simply referred to as the PC5 and the Uu interface is also simply referred to as the Uu.

The sidelink is a technology for performing direct communication between the terminal apparatuses via the PC5, and sidelink transmission and/or reception on the PC5 are performed inside NG-RAN coverage and outside NG-RAN coverage.

There are three transmission modes for NR SL communication, and an SL communication is performed in one of the transmission modes using a pair of a source layer-2 (L2) identifier (ID) and a destination layer-2 (L2) identifier (ID). The source layer-2 identifier and the destination layer-2 identifier may be referred to as a source L2ID and a destination L2ID, respectively. These three transmission modes are "Unicast transmission," "Groupcast transmission," and "Broadcast transmission". Note that the transmission mode may be referred to as a cast type or the like.

The unicast transmission is characterized by (1) support of one PC5-RRC connection between paired UEs, (2) transmission and/or reception of control information and user traffic between UEs on the sidelink, (3) support of sidelink HARQ feedback, (4) transmit power control on the sidelink, (5) support of RLC AM, and (6) detection of a radio link failure for a PC5-RRC connection.

The groupcast transmission is characterized by (1) transmission and/or reception of user traffic between UEs belonging to a sidelink group and (2) support for sidelink HARQ feedback.

The broadcast transmission is characterized by (1) transmission and/or reception of user traffic between UEs on the sidelink.

Figure 2A:
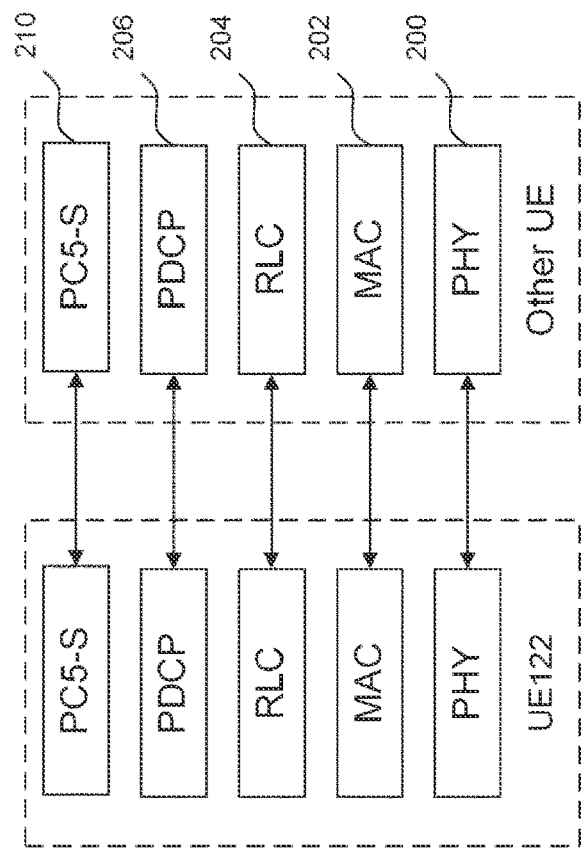
FIGS. 2A and 2B are diagrams of an example of a protocol architecture of a sidelink according to the present embodiment.
Figure 2B:
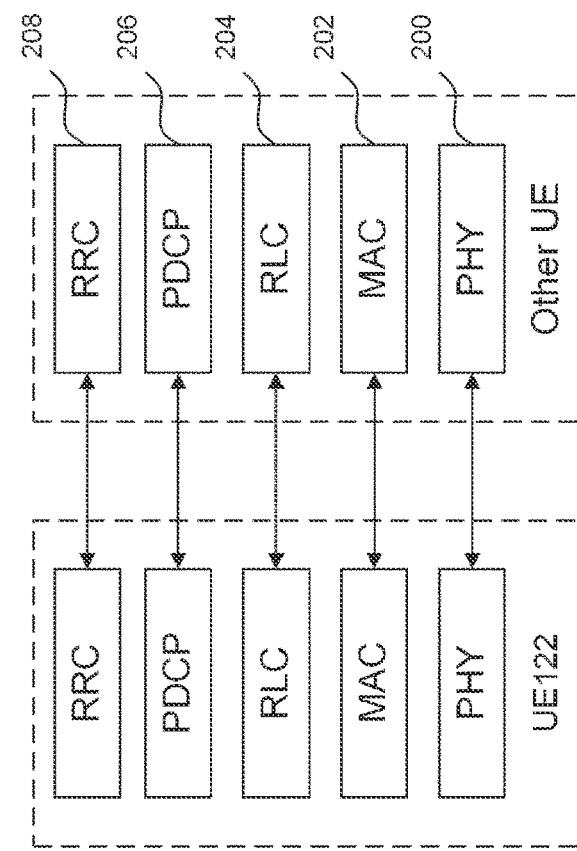
Figure 3B:
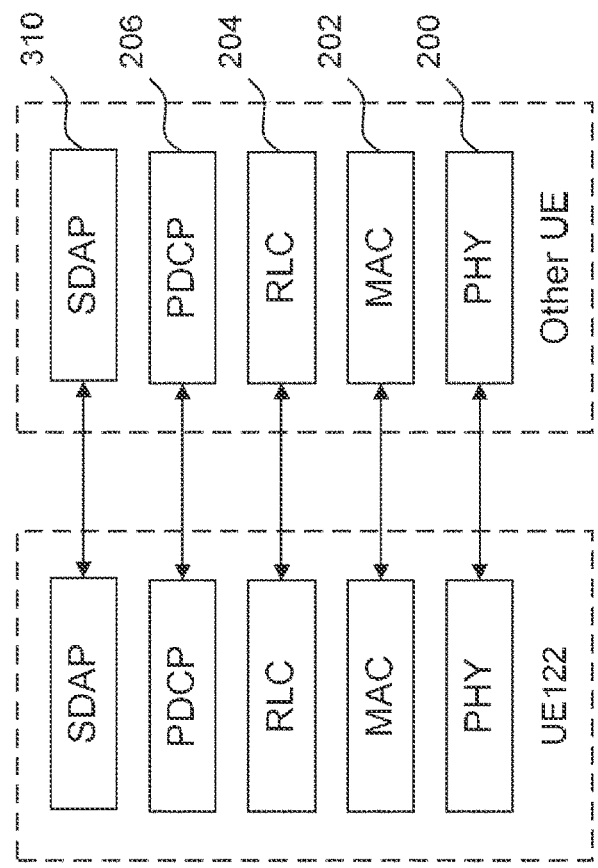
FIGS. 3A and 3B are diagrams of an example of a protocol architecture of a sidelink according to the present embodiment.
Figure 3A:
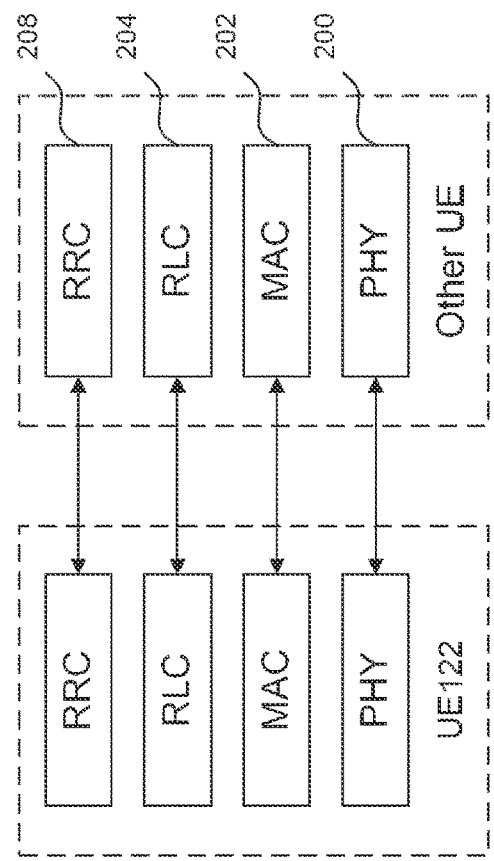

FIGS. 2A and 2B and FIGS. 3A and 3B are diagrams of an example of a protocol architecture in an NR sidelink communication according to the present embodiment. Note that the functions of the protocols described with reference to FIGS. 2A and 2B and/or FIGS. 3A and 3B are some functions closely related to the present embodiment, and other functions may be included. Note that in the present embodiment, a sidelink (SL) may be a link between the terminal apparatuses.

FIG. 2A is a diagram of a protocol stack of a Control Plane (CP) for an SCCH using RRC configured on the PC5 interface. As illustrated in FIG. 2A, the control plane protocol stack for the SCCH using RRC may include a Physical layer (PHY) 200 which is a radio physical layer, a Medium Access Control (MAC) 202 which is a medium access control layer, a Radio Link Control (RLC) 204 which is a radio link control layer, a Packet Data Convergence Protocol (PDCP) 206 which is a packet data convergence protocol layer, and a Radio Resource Control (RRC) 208 which is a radio resource control layer. FIG. 2B is a diagram of a protocol stack of a control plane for an SCCH using PC5-S configured on the PC5 interface. As illustrated in FIG. 2B, the control plane protocol stack for the SCCH using PC5-S may include the Physical layer (PHY) 200 which is a radio physical layer, the Medium Access Control (MAC) 202 which is a medium access control layer, the Radio Link Control (RLC) 204 which is a radio link control layer, the Packet Data Convergence Protocol (PDCP) 206 which is a packet data convergence protocol layer, and a PC5 Signalling (PC5-S) 210 which is a PC5 signalling layer.

FIG. 3A is a diagram of a protocol stack of a control plane for an SBCCH configured on the PC5 interface. As illustrated in FIG. 3A, the control plane protocol stack for the SBCCH may include the Physical layer (PHY) 200 which is a radio physical layer, the Medium Access Control (MAC) 202 which is a medium access control layer, the Radio Link Control (RLC) 204 which is a radio link control layer, and the Radio Resource Control (RRC) 208 which is a radio resource control layer. FIG. 3B is a diagram of a protocol stack of a User Plane (UP) for an STCH configured on the PC5 interface. As illustrated in FIG. 3B, the control plane protocol stack for the STCH may include the Physical layer (PHY) 200 which is a radio physical layer, the Medium Access Control (MAC) 202 which is a medium access control layer, the Radio Link Control (RLC) 204 which is a radio link control layer, the Packet Data Convergence Protocol (PDCP) 206 which is a packet data convergence protocol layer, and a Service Data Adaptation Protocol (SDAP) 310 which is a service data adaptation protocol layer.

Note that an access stratum (AS) layer may be a layer including a part or all of the PHY 200, the MAC 202, the RLC 204, the PDCP 206, the SDAP 310, and the RRC 208. The PC5-S 210 and a Discovery 400 described below may be layers higher than the AS layer.

In the present embodiment, terms such as PHY (PHY layer), MAC (MAC layer), RLC (RLC layer), PDCP (PDCP layer), SDAP (SDAP layer), RRC (RRC layer), and PC5-S (PC5-S layer) may be used. In this case, the PHY (PHY layer), the MAC (MAC layer), the RLC (RLC layer), the PDCP (PDCP layer), the SDAP (SDAP layer), the RRC (RRC layer), the PC5-S (PC5-S layer) may be a PHY (PHY layer), a MAC (MAC layer), an RLC (RLC layer), a PDCP (PDCP layer), an SDAP (SDAP layer), an RRC (RRC layer), and a PC5-S (PC5-S layer) of the NR sidelink protocol, respectively. Note that in a case that a sidelink communication is performed using the E-UTRA technology, the SDAP layer may not be provided. Note that, in order to make it clear that a protocol is a protocol for sidelink, for example, the PDCP may be expressed as the sidelink PDCP or the like, and other protocols by prefixed by "sidelink" may express protocols for sidelink.

In the present embodiment, in a case of distinguishing an E-UTRA protocol and an NR protocol from each other, the PHY, the MAC, the RLC, the PDCP, and the RRC may be referred to as a PHY for E-UTRA or PHY for LTE, a MAC for E-UTRA or MAC for LTE, an RLC for E-UTRA or RLC for LTE, a PDCP for E-UTRA or PDCP for LTE, and an RRC for E-UTRA or RRC for LTE, respectively. The PHY, the MAC, the RLC, the PDCP, and the RRC may be expressed as an E-UTRA PHY or LTE PHY, an E-UTRA MAC or LTE MAC, an E-UTRA RLC or LTE RLC, an E-UTRA PDCP or LTE PDCP, and an E-UTRA RRC or LTE RRC, respectively, or the like. In a case of distinguishing an E-UTRA protocol and an NR protocol from each other, the PHY, the MAC, the RLC, the PDCP, and the RRC may be referred to as a PHY for NR, a MAC for NR, an RLC for NR, a PDCP for NR, and an RRC for NR, respectively. The PHY, the MAC, the RLC, the PDCP, and the RRC may be expressed as an NR PHY, an NR MAC, an NR RLC, an NR PDCP, and an NR RRC, respectively, or the like.

Entities in the AS layer of E-UTRA and/or NR will now be described. An entity having some or all of functions of the physical layer may be referred to as a PHY entity. An entity having some or all of functions of the MAC layer may be referred to as a MAC entity. An entity having some or all of functions of the RLC layer may be referred to as an RLC entity. An entity having some or all of functions of the PDCP layer may be referred to as a PDCP entity. An entity having some or all of functions of the SDAP layer may be referred to as an SDAP entity. An entity having some or all of the functions of the RRC layer may be referred to as an RRC entity. The PHY entity, the MAC entity, the RLC entity, the PDCP entity, the SDAP entity, and the RRC entity may be rephrased as a PHY, a MAC, an RLC, a PDCP, an SDAP, and an RRC, respectively.

Note that data provided from the MAC, the RLC, the PDCP, and the SDAP to a lower layer and/or data provided to the MAC, the RLC, the PDCP, and the SDAP from a lower layer may be referred to as a MAC Protocol Data Unit (PDU), an RLC PDU, a PDCP PDU, and an SDAP PDU, respectively. Data provided to the MAC, the RLC, the PDCP, and the SDAP from a higher layer and/or data provided from the MAC, the RLC, the PDCP, and the SDAP to a higher layer may be referred to as a MAC Service Data Unit (SDU), an RLC SDU, a PDCP SDU, and an SDAP SDU, respectively. A segmented RLC SDU may be referred to as an RLC SDU segment.

Here, the base station apparatus and the terminal apparatus exchange (transmit and/or receive) signals with each other in higher layers on the Uu interface. The higher layer may be referred to as an upper layer, and both may be interchangeably interpreted. For example, the base station apparatus and the terminal apparatus may transmit and/or receive an RRC message (also referred to as RRC signalling) in a Radio Resource Control (RRC) layer. In a Medium Access Control (MAC) layer, the base station apparatus and the terminal apparatus may transmit and/or receive a MAC Control Element. The RRC layer of the terminal apparatus acquires system information broadcast from the base station apparatus. In this regard, the RRC message, the system information, and/or the MAC control element is also referred to as higher layer signaling or a higher layer parameter. Each of the parameters included in the higher layer signaling received by the terminal apparatus may be referred to as a higher layer parameter. For example, the higher layer in processing in the PHY layer may mean a higher layer as viewed from the PHY layer, and thus may include one or more of the MAC layer, the RRC layer, the RLC layer, the PDCP layer, a Non Access Stratum (NAS) layer, and the like. For example, the higher layer in processing in the MAC layer may mean one or more of the RRC layer, the RLC layer, the PDCP layer, the NAS layer, and the like.

The terminal apparatuses also exchange (transmit and/or receive) signals with each other in higher layers on the PC5 interface. The terminal apparatuses may transmit and/or receive an RRC message (also referred to as RRC signalling) in a Radio Resource Control (RRC) layer. In a Medium Access Control (MAC) layer, the base station apparatus and the terminal apparatus may transmit and/or receive a MAC Control Element. In this regard, the RRC message and/or the MAC control element is also referred to as higher layer signaling or a higher layer parameter. Each of the parameters included in the higher layer signaling received by the terminal apparatus may be referred to as a higher layer parameter. For example, the higher layer in processing in the PHY layer may mean a higher layer as viewed from the PHY layer, and thus may include one or more of the MAC layer, the RRC layer, the RLC layer, the PDCP layer, the PC5-S layer, the Discovery layer, and the like. For example, the higher layer in processing in the MAC layer may mean one or more of the RRC layer, the RLC layer, the PDCP layer, the PC5-S layer, the Discovery layer, and the like.

Hereinafter, "A is given (provided) in the higher layer" or "A is given (provided) by the higher layer" may mean that the higher layer (mainly the RRC layer, the MAC layer, or the like) of the terminal apparatus receives A from the base station apparatus or another terminal apparatus, and that A received is given (provided) from the higher layer of the terminal apparatus to the physical layer of the terminal apparatus. For example, "being provided with a higher layer parameter" in the terminal apparatus may mean that higher layer signaling is received from the base station apparatus or another terminal apparatus, and the higher layer parameter included in the received higher layer signaling is provided from the higher layer of the terminal apparatus to the physical layer of the terminal apparatus. A higher layer parameter being configured for the terminal apparatus may mean that the higher layer parameter is given (provided) to the terminal apparatus. For example, the higher layer parameter being configured for the terminal apparatus may mean that the terminal apparatus receives higher layer signaling from the base station apparatus or another terminal apparatus and configures the received higher layer parameter in the higher layer. Here, a higher layer parameter being configured for the terminal apparatus may include a default parameter given in advance to the higher layer of the terminal apparatus being configured. In describing transmission of an RRC message from the terminal apparatus to the base station apparatus or another terminal apparatus, an expression may be used that a message is submitted from the RRC entity of the terminal apparatus to a lower layer. In the terminal apparatus, "submitting a message to a lower layer" from the RRC entity may mean submitting the message to the PDCP layer. In the terminal apparatus, "submitting a message to a lower layer" from the RRC layer may mean submitting the message to a PDCP entity corresponding to each SRB (SRB 0, SRB 1, SRB 2, SRB 3, etc.) since the RRC message is transmitted using the SRB. In a case that the RRC entity of the terminal apparatus receives an indication from a lower layer, the lower layer may refer to one or more of the PHY layer, the MAC layer, the RLC layer, the PDCP layer, and the like.

An example of the function of the PHY will be described. The PHY of the terminal apparatus may have a function to transmit and/or receive data transmitted via a sidelink (SL) Physical channel with a PHY of another terminal apparatus. The PHY may be connected with the MAC of a higher layer via a transport channel. The PHY may transfer data to and/or from the MAC via the transport channel. The PHY may also be provided with data from the MAC via the transport channel. In the PHY, in order to identify various pieces of control information, a Radio Network Temporary Identifier (RNTI) may be used.

Now, the physical channels will be described. The physical channels used for a radio communication between the terminal apparatus and the base station apparatus may include the following physical channels.

Physical Sidelink Broadcast CHannel (PSBCH)
Physical Sidelink Control CHannel (PSCCH)
Physical Sidelink Shared CHannel (PSSCH)
Physical Sidelink Feedback CHannel (PSFCH)

The PSBCH is used to broadcast the system information required by the terminal apparatus.

The PSCCH may be used to indicate resources or other transmission parameters for the PSSCH.

The PSSCH may be used to transmit data and control information related to HARQ/CSI feedback to another terminal apparatus.

The PSFCH may be used to carry HARQ feedback to another terminal apparatus.

An example of the function of the MAC will be described. The MAC may be referred to as a MAC sublayer. The MAC may have a function to map various Logical Channels to corresponding transport channels. The logical channel may be identified by a Logical Channel Identity (or Logical Channel ID). The MAC may be connected with the RLC of a higher layer via the logical channel. The logical channels may be classified, depending on a type of information to be transmitted, into a control channel for transmitting control information and a traffic channel for transmitting user information. The MAC may have a function to multiplex the MAC SDUs belonging to one logical channel or multiple different logical channels and provide the multiplexed MAC SDUs to the PHY. The MAC may have a function to demultiplex the MAC PDUs provided from the PHY and provide the demultiplexed MAC PDUs to a higher layer via a logical channel to which each MAC SDU belongs. The MAC may have a function to perform error correction through Hybrid Automatic Repeat Request (HARQ). The MAC may have a function to report scheduling information. The MAC may have a function to perform priority processing between the terminal apparatuses by using dynamic scheduling. The MAC may have a function to perform priority processing between the logical channels in one terminal apparatus. The MAC may have a function to perform priority processing of overlapping resources in one terminal apparatus. The E-UTRA MAC may have a function to identify Multimedia Broadcast Multicast Services (MBMS). The NR MAC may have a function to identify a Multicast/Broadcast Service (MBS). The MAC may have a function to select a transport format. The MAC may have a function to perform Discontinuous Reception (DRX) and/or Discontinuous Transmission (DTX), a function to perform a Random Access (RA) procedure, a Power Headroom Report (PHR) function to notify of information on transmittable power, a Buffer Status Report (BSR) function to notify of information on a data amount of a transmission buffer, and the like. The NR MAC may have a Bandwidth Adaptation (BA) function. A MAC PDU format used for the E-UTRA MAC may be different from a MAC PDU format used for the NR MAC. The MAC PDU may include a MAC control element (MAC CE), which is an element for performing control in the MAC.

The MAC sublayer may additionally provide services and functions, on the PC5 interface, such as radio resource selection for selecting a radio resource for performing sidelink transmission, filtering of packets received in sidelink communication, priority processing between uplink and sidelink, and Sidelink Channel State Information (Sidelink CSI) reporting.

A logical channel for sidelink (SL) and mapping between the logical channel for sidelink and a transport channel used in E-UTRA and/or NR will be described.

The Sidelink Broadcast Control Channel (SBCCH) may be a logical channel for sidelink for broadcasting sidelink system information from one terminal apparatus to one or more terminal apparatuses. The SBCCH may be mapped to an SL-BCH which is a sidelink transport channel.

The Sidelink Control Channel (SCCH) may be a logical channel for sidelink for transmitting control information such as a PC5-RRC message and an PC5-S message from one terminal apparatus to one or more terminal apparatuses. The SCCH may be mapped to an SL-SCH which is a sidelink transport channel.

A Sidelink Traffic Control Channel (STCH) may be a logical channel for sidelink for transmitting user information from one terminal apparatus to one or more terminal apparatuses. The STCH may be mapped to an SL-SCH which is a sidelink transport channel.

An example of the function of the RLC will be described. The RLC may be referred to as an RLC sublayer. The E-UTRA RLC may have a function to segment and/or concatenate data provided from the PDCP of the higher layer and provide the data to the lower layer. The E-UTRA RLC may have a function to perform reassembly and re-ordering on data provided from the lower layer and provide the data to the higher layer. The NR RLC may have a function to add a sequence number independent of a sequence number added in the PDCP to the data provided from the PDCP of the higher layer. The NR RLC may have a function to segmenting the data provided from the PDCP and provide the segmented data to the lower layer. The NR RLC may have a function to perform reassembly on the data provided from the lower layer and provide the reassembled data to the higher layer. The RLC may have a data retransmission function and/or retransmission request function (Automatic Repeat reQuest (ARQ)). The RLC may have a function to perform error correction by the ARQ. Control information indicating data that needs to be retransmitted, which is transmitted from a reception side to a transmission side of the RLC in order to perform the ARQ, may be referred to as a status report. A status report transmission indication transmitted from the transmission side to the reception side of the RLC may be referred to as a poll. The RLC may have a function to detect data duplication. The RLC may have a function to discard data. The RLC may have three modes, namely a Transparent Mode (TM), an Unacknowledged Mode (UM), and an Acknowledged Mode (AM). In the TM, segmentation of data received from a higher layer may not be performed, and addition of an RLC header need not be performed. A TM RLC entity is a uni-directional entity and may be configured as a transmitting TM RLC entity or a receiving TM RLC entity. In the UM, segmentation and/or concatenation of data received from a higher layer, addition of an RLC header, and the like may be performed, but retransmission control of data may not be performed. A UM RLC entity may be a uni-directional entity or a bi-directional entity. In a case that the UM RLC entity is a uni-directional entity, the UM RLC entity may be configured as a transmitting UM RLC entity or as a receiving UM RLC entity. In a case that the UM RLC entity is a bi-directional entity, a UM RRC entity may be configured as a UM RLC entity consisting of a transmitting side and a receiving side. In the AM, segmentation and/or concatenation of data received from a higher layer, addition of an RLC header, retransmission control of data, and the like may be performed. An AM RLC entity is a bi-directional entity and may be configured as an AM RLC consisting of a transmitting side and a receiving side. Note that data provided to a lower layer and/or data provided from a lower layer in the TM may be referred to as a TMD PDU. Data provided to a lower layer and/or data provided from a lower layer in the UM may be referred to as a UMD PDU. Data provided to a lower layer and/or data provided from a lower layer in the AM may be referred to as an AMD PDU. An RLC PDU format used for the E-UTRA RLC may be different from an RLC PDU format used for the NR RLC. The RLC PDU may include an RLC PDU for data and an RLC PDU for control. The RLC PDU for data may be referred to as an RLC DATA PDU (RLC Data PDU, RLC data PDU). The RLC PDU for control may be referred to as an RLC CONTROL PDU (RLC Control PDU, RLC control PDU).

Note that in the sidelink, the TM may be used for the SBCCH, only the UM is used for groupcast transmission and broadcast transmission, and the UM and the AM can be used for unicast transmission. In the sidelink, the UM in groupcast transmission and broadcast transmission supports only uni-directional transmission.

An example of the function of the PDCP will be described. The PDCP may be referred to as a PDCP sublayer. The PDCP may have a function to perform sequence number maintenance. The PDCP may have a header compression/decompression function to efficiently transmit user data such as an IP Packet and an Ethernet frame, in a radio section. A protocol used for header compression/decompression of an IP packet may be referred to as a Robust Header Compression (ROHC) protocol. A protocol used for Ethernet frame header compression/decompression may be referred to as an Ethernet (trade name) header compression (EHC) protocol. The PDCP may have a data encryption/decryption function. The PDCP may have a data integrity protection/integrity verification function. The PDCP may have a re-ordering function. The PDCP may have a PDCP SDU retransmission function. The PDCP may have a function to discard data using a discard timer. The PDCP may have a Duplication function. The PDCP may have a function to discard duplicate receive data. The PDCP entity is a bi-directional entity and may include a transmitting PDCP entity and a receiving PDCP entity. A PDCP PDU format used for the E-UTRA PDCP may be different from a PDCP PDU format used for the NR PDCP. The PDCP PDU may include a PDCP PDU for data and a PDCP PDU for control. The PDCP PDU for data may be referred to as a PDCP DATA PDU (PDCP Data PDU, PDCP data PDU). The PDCP PDU for control may be referred to as a PDCP CONTROL PDU (PDCP Control PDU, PDCP control PDU).

Note that in the sidelink, there are the following restrictions on the functions and services of the PDCP.
 (1) Out-of-order delivery may be supported only by unicast transmission.
 (2) Duplication on the PC5 interface is not supported.

An example of the function of the SDAP will be described. The SDAP is a service data adaptation protocol layer. In the sidelink, the SDAP may have a function to perform association (mapping) between a QoS flow in the sidelink sent from a terminal apparatus to another terminal apparatus and a sidelink data radio bearer (DRB). The SDAP may have a function to store mapping rule information. The SDAP may have a function to perform marking a QoS flow identifier (QFI). Note that the SDAP PDU may include an SDAP PDU for data and an SDAP PDU for control. The SDAP PDU for data may be referred to as an SDAP DATA PDU (SDAP Data PDU, SDAP data PDU). The SDAP PDU for control may be referred to as an SDAP CONTROL PDU (SDAP Control PDU, SDAP control PDU). Note that in the sidelink, there may be one SDAP entity of the terminal apparatus per destination for any one of unicast transmission, groupcast transmission, and broadcast transmission associated with the destination. A reflective QoS is not supported on the PC5 interface.

An example of the function of the RRC will be described. The RRC may support services and functions on the PC5 interface such as forwarding of a PC5-RRC message between peer UEs, maintenance and release of a PC5-RRC connection between two UEs, and detection of a sidelink radio link failure for a PC5-RRC connection. The PC5-RRC connection is a logical connection between two UEs corresponding to a pair of source L2ID and destination L2ID, and is considered to be established after a corresponding PC5 unicast link is established. There is a one to-one correspondence between the PC5-RRC connection and the PC5 unicast link. A UE may have multiple PC5-RRC connections to one or more UEs for different pairs of source L2ID and destination L2ID. Separate PC5-RRC procedures and messages may be used for a UE to transfer UE capability and sidelink configuration to a peer UE. Both peer UEs may exchange their own UE capabilities and sidelink configurations with each other using separate bi-directional procedures. In a case that the sidelink transmission is not of interest, in a case that a sidelink radio link failure is detected for the PC5-RRC connection, and in a case that a layer 2 link release procedure is completed, the UE releases the PC5-RRC connection.

The NR sidelink may support a DRX function (SL DRX) for unicast, groupcast, and broadcast. Multiple parameters similar to Uu DRX may be used to determine an active time in the SL DRX (SL active time). During the SL active time, the terminal apparatus may perform SCI monitoring for data reception. During other than the SL active time (also referred to as an SL inactive time or an SL DRX inactive time), the terminal apparatus may skip the SCI monitoring for data reception.

The SL active time of a receiving side UE (RX UE) in sidelink communication may include times during which an SL on-duration timer(s), an SL inactivity timer(s), and an SL retransmission timer(s) applied to the RX UE are running. Further, a slot associated with a periodic transmission announced by a transmitting UE (TX UE) in sidelink communication and a time during which an RX UE is waiting for (expecting) a CSI report of the TX UE for a CSI request by the RX UE may be determined as the SL active time of the RX UE.

The TX UE may maintain multiple sets of multiple timers (SL DRX timers) corresponding to multiple timers (SL DRX timers) used for the SL DRX of the RX UE for each pair of source L2 ID and destination L2 ID in unicast and/or for each destination L2 ID in groupcast/broadcast. In a case that there is data to transmit to one or more RX UEs configured with the SL DRX, the TX UE may select transmission resources taking into account the SL active time of the one or more RX UEs determined by multiple timers maintained by the TX UE.

The terminal apparatus (TX UE and/or RX UE) may determine whether the base station apparatus supports the SL DRX based on SIB 12 broadcast by the base station apparatus.

The default SL DRX configuration for groupcast and broadcast may be used for a discovery message and relay discovery message in sidelink discovery.

In unicast, the SL DRX may be configured for each pair of source L2 ID and destination L2 ID.

The terminal apparatus may maintain a set of SL DRX timers for each direction for each pair of source L2 ID and destination L2 ID. An SL DRX configuration for a pair of source L2 ID and destination L2 ID in a direction may be negotiated between the terminal apparatuses in the AS layer.

In order to configure the SL DRX configuration in each direction of the TX UE and the RX UE, the following processes (A) to (D) may be performed.

(A) The RX UE may transmit assistance information to the TX UE. The assistance information may include SL on-duration timer, SL DRX start offset, and SL DRX cycle expected (desired) by the RX UE. The TX UE using a sidelink mode 2 resource allocation may use the assistance information to determine the SL DRX configuration for the RX UE.

(B) A TX UE in RRC IDLE, RR INACTIVE, or Out-of-Coverage (OOC) and/or a TX UE using the mode 2 resource allocation may determine the SL DRX configuration for the RX UE regardless of whether the assistance information is provided. Regardless of whether the assistance information is provided, in a case that the TX UE is in RRC_CONNECTED and uses a mode 1 resource allocation, the SL DRX configuration for the RX UE may be determined by the base station apparatus serving the TX UE.

(C) The TX UE may transmit the SL DRX configuration used by the RX UE to the RX UE.

(D) The RX UE may accept or reject the SL DRX configuration received from the TX UE.

The default SL DRX configuration for groupcast/broadcast may be used for a direct communication request (DCR) message.

In a case that the TX UE is in RRC_CONNECTED, the TX UE may report the received assistance information to the base station apparatus serving the TX UE. Then, in a case that the TX UE is in RRC_CONNECTED, the TX UE may transmit the SL DRX configuration received from the base station apparatus through RRC signalling to the RX UE.

In a case that the RX UE is in RRC_CONNECTED, the RX UE may report the received SL DRX configuration to the base station apparatus serving the RX UE. Accordingly, for example, the base station apparatus can also adjust the DRX configuration of the Uu link between the base station apparatus and the terminal apparatus based on the SL DRX configuration.

The SL on-duration timer, the SL inactivity timer, an SL HARQ RTT timer, and an SL HARQ retransmission timer may be supported in unicast. The SL HARQ RTT timer and the SL HARQ retransmission timer may be maintained per sidelink process (SL process) of the RX UE. In addition to values configured (in advance) for the respective these timers, a value of the SL HARQ RTT timer may be generated (derived) from the retransmission resource timing in a case that the SCI indicates two or more transmission resources.

An SL DRX MAC CE may be introduced in unicast.

In groupcast/broadcast, the SL DRX may be commonly configured for multiple terminal apparatuses based on a QoS profile and the destination L2 ID. Multiple SL DRX configurations may be supported in each groupcast/broadcast.

The SL on-duration timer, the SL inactivity timer, the SL HARQ RTT timer, and the SL HARQ retransmission timer may be supported in groupcast. Only the SL on-duration timer may be supported in broadcast. An SL DRX cycle, an SL on-duration, and the SL inactivity timer (for groupcast) may be configured per QoS profile.

A starting offset and slot offset of the SL DRX cycle may be determined based on the destination L2 ID. The SL HARQ RTT timer for groupcast and the SL HARQ retransmission timer for groupcast may not be configured per QoS profile or per destination L2 ID. The SL HARQ RTT timer for groupcast and the SL HARQ retransmission timer for groupcast may be maintained per SL process of the RX UE. The SL HARQ RTT timer for groupcast may be set to different values in order to support both HARQ enabled transmission and HARQ disabled transmission.

In groupcast, the RX UE may maintain the SL inactivity timer for each destination L2 ID. The RX UE may select, as the value of the SL inactivity timer, the largest value among the values of the SL inactivity timer associated with each of the multiple different QoS profiles for a certain L2 ID. In groupcast and broadcast, the RX UE may maintain a single SL DRX cycle and a single SL on-duration for each destination L2 ID in a case that multiple different QoS profiles are configured for an L2 ID.

The default SL DRX configuration common to groupcast and broadcast may be used for a QoS profile that is not mapped to non-default SL DRX configuration.

The TX UE and RX UE in RRC IDLE or RRC INACTIVE in-coverage may acquire the SL DRX configuration from the SIB. The TX UE and RX UE in RRC_CONNECTED may acquire the SL DRX configuration from the SIB or may be notified of the SL DRX configuration through RRC signalling at the time of handover. The RX UE out-of-coverage may acquire the SL DRX configuration from a pre-configuration.

In groupcast, the TX UE may restart its own timer corresponding to the SL inactivity timer for the destination L2 ID based on receiving new data from that destination L2 ID.

A TX profile may be introduced to ensure compatibility for groupcast and broadcast transmissions between the terminal apparatus supporting the SL DRX function and the terminal apparatus not supporting. The TX profile may be provided to the AS layer from a higher layer of the AS layer. The TX profile may identify one or more sidelink feature groups. A TX profile supporting multiple SL DRXs and a TX profile not supporting an SL DRX may be associated with one destination L2 ID. The TX UE may assume an SL DRX for a destination L2 ID only in a case that all TX profiles associated with that destination L2 ID support the SL DRX. The TX UE does not assume an SL DRX for a destination L2 ID in a case that no TX profile is associated with that destination L2 ID. The RX UE may determine that an SL DRX is used in a case that all destination L2 ID of interest are assumed to support the SL DRX. In groupcast, the terminal apparatus may report an SL DRX ON/OFF indication associated with each destination L2 ID to the base station apparatus.

Alignment of Uu DRX and SL DRX for a terminal apparatus in RRC_CONNECTED may be supported in unicast, groupcast, and broadcast in SL communication. Alignment of Uu DRX and SL DRX at the same terminal apparatus may be supported. In addition, alignment of Uu DRX of the TX UE and SL DRX of the RX UE may be supported in mode 1 scheduling. The alignment may include full overlap or partial overlap in time between Uu DRX and SL DRX. The alignment may be accomplished by the base station apparatus.

Figure 4:
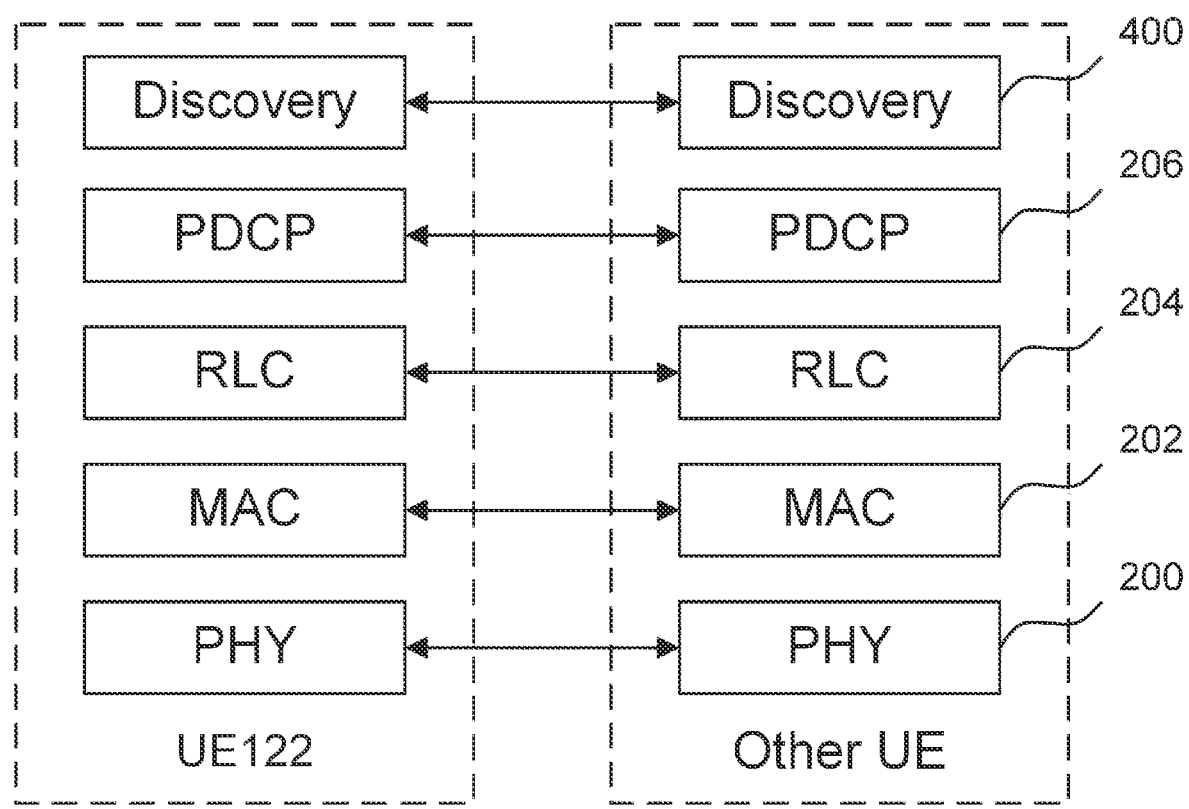
FIG. 4 is a diagram of an example of a protocol architecture of a sidelink according to the present embodiment.

A terminal apparatus capable of sidelink communication may perform discovery. Model A and Model B may be present in discovery. FIG. 4 illustrates a protocol stack in a discovery procedure. The Mode A may use a single discovery protocol message and the Model B may use two discovery protocol messages. The single discovery protocol message in the Model A may be an Announcement message, and the discovery protocol message in the Model B may be a Solicitation message and a Response message. Outline of procedures of Model A and Model B in ProSe Direct Discovery will be described below.

In the Model A, a UE transmitting an announce message may be referred to as an Announcing UE, and a UE monitoring an announce message may be referred to as a Monitoring UE. The announce message may include information such as a discovery message type, a ProSe Application Code or a ProSe Restricted Code, and a security protection element, and may additionally include metadata information. The announce message is transmitted using the destination L2ID (Destination Layer-2 ID) and the source L2ID (Source Layer-2 ID), and the monitoring UE determines the destination L2ID to receive the announce message. Note that the destination L2ID may be a layer 2 (Layer-2) identifier of the destination UE, and the source L2ID may be a layer 2 identifier of the source UE. The destination UE may be simply referred to as a destination.

In the Model B, a UE transmitting a solicitation message may be referred to as a discoverer UE, and a UE receiving a solicitation message and/or a UE transmitting a response message to a discoverer UE may be referred to as a discoveree UE. The solicitation message may include information such as a discovery message type, a ProSe Query Code, and a security protection element. The solicitation message is transmitted using the destination L2ID and the source L2ID, and the discoveree UE determines the destination L2ID to receive the solicitation message. The discoveree UE responding to the solicitation message transmits a response message. The response message may include information such as a discovery message type, a ProSe Response Code, and a security protection element, and may additionally include metadata information. The response message is transmitted using the source L2ID and the destination L2ID is set to the source L2ID of the received solicitation message.

In discovery, there may be a type other than ProSe Direct Discovery for discovering another UE in order to perform direct communication with another UE, specifically, there may be Group member Discovery for discovering one or more UEs in order to perform communication within a group using a sidelink, 5G ProSe UE-to-Network Relay Discovery for discovering candidate relay UEs in order to connect to a network via a relay UE, and the like. Note that although the above-described discovery is an example of discovery provided by an application called ProSe, in addition to the above-described types, there may be different types of discovery according to an application or service performing sidelink communication. The information included in the discovery protocol message may vary according to the type of discovery, and an additional message may be transmitted to transmit additional information.

FIG. 4 is a diagram illustrating an example of a protocol architecture including a discovery protocol according to the present embodiment. As illustrated in FIG. 4, the control plane protocol stack for the SBCCH may include the Physical layer (PHY) 200 which is a radio physical layer, the Medium Access Control (MAC) 202 which is a medium access control layer, the Radio Link Control (RLC) 204 which is a radio link control layer, and the Discovery 400 which is a discovery protocol layer. The Discovery 400 may be a protocol used to handle a procedure related to discovery. An interface between UEs performing discovery may be referred to as a PC5-D.

Multiple resource pools for transmitting the discovery message may be configured, and one or more resource pools may be configured dedicated to discovery. In a case that the discovery-dedicated resource pool is configured, the UE may use the discovery dedicated resource pool as a resource pool for transmitting the discovery message, and in a case that the discovery-dedicated resource pool is not configured, the UE may use the resource pool for sidelink communication as a resource pool for transmitting the discovery message. Note that multiple resource pools for sidelink communication and the multiple discovery-dedicated resource pools may be configured at the same time. Each resource pool may be configured through UE-dedicated signalling or may be preconfigured.

In each unicast PC5-RRC connection, a sidelink signalling radio bearer (SRB) may be configured. A sidelink SRB used to transmit a PC5-S message before PC5-S security is established may be referred to as an SL-SRB 0. A sidelink SRB used to transmit a PC5-S message to establish the PC5-S security may be referred to as an SL-SRB 1. A sidelink SRB used to transmit a protected PC5-S message after the PC5-S security is established may be referred to as an SL-SRB 2. A sidelink SRB used to transmit a protected PC5-RRC signalling after the PC5-S security is established may be referred to as an SL-SRB 3. A sidelink SRB used to transmit and/or receiving a discovery message in NR may be referred to as an SL-SRB 4. Note that the PC5-RRC signalling may be RRC signalling between UEs that is transmitted and/or received on the PC5. Note that the PC5-RRC signalling may be referred to as a PC5-RRC message or the like.

A UE-to-UE relay in the sidelink will be described. The UE-to-UE relay may refer to a technology in which in a case that a source UE communicates with a destination UE, the source UE performs communication via sidelink communication with a Relay UE. The relay UE may function and/or act to forward (or relay) data for the destination UE received from the source UE to the destination UE. The source UE, the destination UE, and the relay UE may be referred to by different names. For example, each of the source UE and the destination UE may be referred to as a remote (remote) UE, a U2U Remote UE, or the like, and the relay UE may be referred to as a U2U relay UE, or the like. The term "UE-to-UE relay" may also be referred to as a U2U relay.

Figure 6:
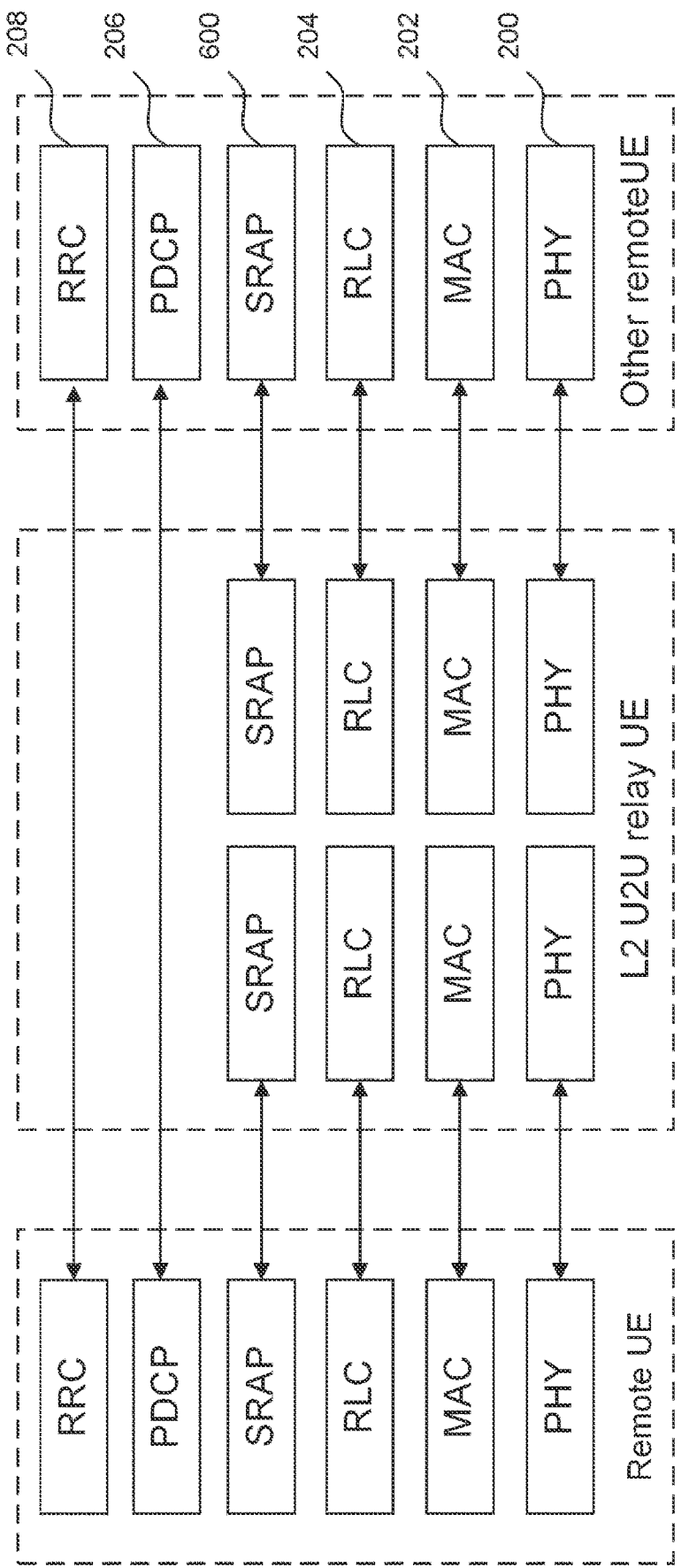
FIG. 6 is a diagram of an example of a protocol architecture of a sidelink according to the present embodiment.
Figure 7:
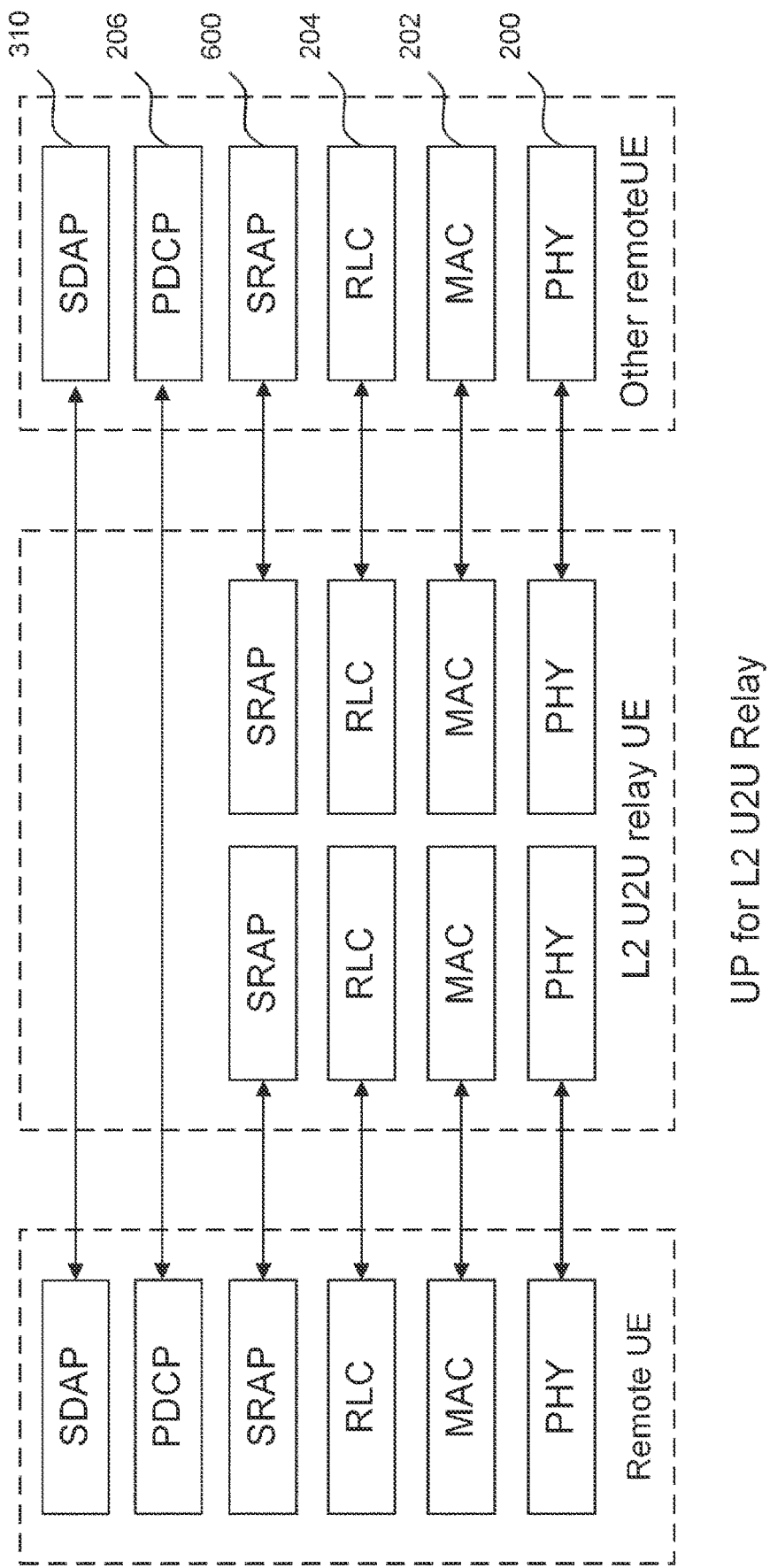
FIG. 7 is a diagram of an example of a protocol architecture of a sidelink according to the present embodiment.

FIG. 6 and FIG. 7 illustrate examples of protocol stacks of a control plane (CP) and a user plane (UP) in a layer 2 (L2) UE-to-UE (U2U) relay. As illustrated in FIG. 6 and FIG. 7, an SRAP 600 may be present. The SRAP 600 may be referred to as a Sidelink Relay Adaptation Protocol layer (SRAP layer), an SRAP layer, or the like, and different names may be used. As illustrated in FIG. 6 and FIG. 7, the PHY 200, the MAC 202, the RLC 204, and the SRAP 600 may be respectively associated between the remote UE and the L2 U2U relay UE, and between the L2 U2U relay UE and the other remote UE, and the PDCP 206, the RRC 208, and the SDAP 310 may be respectively associated between the remote UE and the other remote UE. Note that, as illustrated in FIGS. 2A and 2B, in order to control the PC5 connection between the remote UE and the other remote UE, the PC5-S 210 (not illustrated) may be used instead of the RRC 208. Note that, in the protocol stack in a layer 3 (L3) UE-to-UE relay, the PHY 200, the MAC 202, the RLC 204, the PDCP 206, the RRC 208, and the SDAP 210 may be respectively associated between the remote UE and the U2U relay UE, and between the U2U relay UE and the other remote UE, and the SRAP 600 may not be configured (not illustrated). In the L3 U2U relay, a layer higher than the SDAP may have a function to transmit, in the PC5 link, data received in the Uu link. The SRAP layer may be included in the AS layer.

Here, the SRAP will be described. The SRAP layer may include an SRAP sublayer. The SRAP sublayer may be present higher than the RLC sublayer for the control plane and the user plane of the PC5 interface and lower than the PDCP sublayer for the control plane and the user plane of the PC5 interface. The SRAP sublayer on the PC5 may be used for the purpose of bearer mapping. In the L2 U2U Relay UE, the SRAP sublayer includes one SRAP entity on the PC5 interface between the source UE and the relay UE, and may include a separate collocated SRAP entity on the PC5 interface between the relay UE and the destination UE. In the L2 U2U Remote UE, the SRAP sublayer may include only one SRAP entity on one PC5 interface. The SRAP entity associated between the Remote UE and the Relay UE through the PC5 interface may be specifically referred to as a PC5-SRAP. Each SRAP entity may have a transmitter and a receiver. On the PC5 interface, the transmitter of the SRAP entity of the L2 U2U Remote UE may be associated with the receiver of the SRAP entity of the L2 U2U Relay UE, and the receiver of the SRAP entity of the L2 U2U Remote UE may be associated with the transmitter of the SRAP entity of the L2 U2U Relay UE.

The SRAP entity may have a function to forward data, a function to determine a UE ID and bearer ID fields of the SRAP header to be added to the data packet, function to determine an egress link, and a function to determine an egress RLC channel. In addition, the SRAP entity may have other functions.

In a case that the remote UE transmits data for sidelink to other remote UE, the remote UE may be referred to as a source UE or the like, and other remote UE may be referred to as a destination UE or the like. Similarly, in an opposite case that the other remote UE transmits data for sidelink to the remote UE, the other remote UE may be referred to as a source UE or the like, and the remote UE may be referred to as a destination UE or the like. Note that the source UE may be referred to as, for example, a source remote UE, simply a remote UE, or may be interchangeably interpreted. The destination UE may be referred to as, for example, a destination remote UE, simply a remote UE, a target UE, or the like, or may be interchangeably interpreted. The source UE and the destination UE may be identified by different names, or may be referred to as, for example, a U2U source UE and a U2U destination UE in order to clarify that the UEs are terminals performing U2U relay. The source UE and the destination UE may be referred to as, for example, an L2 U2U source UE, an L2 U2U destination UE, or the like in order to clarify that the communication is performed by the L2 U2U relay, or may be referred to as, for example, a L3 U2U source UE, a L3 U2U destination UE, or the like, similarly, in a case of clarifying that communication is performed by the L3 U2U relay. For example, even not in the case that any one of the remote UE and the other remote UE transmits the data for sidelink, in a case that, for example, a set of U2U relays (a set of one remote UE, one relay UE, and another remote UE) is configured, a UE that is other than the U2U relay UE and initially transmits a discovery message may be referred to as a source UE, and a UE that is neither the source UE nor the U2U relay UE in the U2U relay may be referred to as a destination UE, or names such as the source UE and the destination UE may be used to simply distinguish between the two remote UEs.

In the sidelink, the Reference Signal Received Power (RSRP) measured by the UE may be, for example, the following RSRP. The following RSRP may be referred to as an SL-RSRP.

(a) PSBCH RSRP
(b) PSSCH RSRP
(c) PSCCH RSRP

The PSBCH-RSRP (PSBCH RSRP) may be defined as a linear average of power contributions of resource elements transmitting multiple Demodulation Reference Signals (DMRS) associated with the PSBCH. The PSSCH-RSRP (PSSCH RSRP) may be defined as a linear average of power contributions of resource elements of antenna ports transmitting multiple DMRSs associated with the PSSCH, and in a case that there are multiple antenna ports, values of RSRP for the respective antenna ports may be summed. The PSCCH-RSRP (PSCCH RSRP) may be defined as a linear average of the power contributions of resource elements transmitting multiple DMRS associated with the PSCCH. Note that the DMRS may be used to demodulate, for example, signals of the PSBCH, the PSSCH, and the PSCCH. The terminal apparatus may measure the RSRP for the discovery message (SD-RSRP) using the power contributions of the resource elements transmitting the DMRS associated with the discovery message.

In the measurement in the sidelink, the UE 122 may measure the following quantities in addition to the SL-RSRP.

(a) Sidelink received signal strength indicator (SL RSSI)
(b) Sidelink channel Occupancy ratio (SL CR)
(c) Sidelink channel busy ratio (SL CBR)

There are two resource allocation modes for NR sidelink communication, where a mode in which the UE uses a resource scheduled by the base station to perform sidelink transmission is referred to as a mode 1, and a mode in which the UE automatically selects a resource to perform sidelink transmission is referred to as a mode 2. In the mode 1, the UE needs to be in RRC_CONNECTED, and in the mode 2, the UE is capable of sidelink transmission regardless of the RRC state or whether it is inside or outside the NG-RAN. Note that, in the mode 2, the UE automatically selects a resource capable of sidelink transmission from one or more resource pools configured before the sidelink transmission is performed.

Next, the sidelink radio link failure will be described. The terminal apparatus that performs the sidelink communication may determine that the sidelink radio link failure is detected in a case that any of the following conditions is satisfied.

(a) It is notified by the sidelink RLC that the number of retransmissions to a specific destination has reached the maximum number of retransmissions.
(b) T400 for a specific destination has expired.
(c) It is notified by the MAC entity that the number of continuous (consecutive) HARQ DTXs for a specific destination has reached the maximum number.
(d) Integrity check failure is notified by the sidelink PDCP entity related to the SL-SRB 2 or SL-SRB 3 for a specific destination.

The UE 122 performing sidelink transmission uses a sidelink grant (or SL grant) to perform transmission. The sidelink grant is dynamically received on a PDCCH transmitted by the base station apparatus, semi-persistently configured through RRC signalling transmitted by the base station apparatus, or automatically selected by a MAC entity of the terminal apparatus. Note that a transmission mode in which the sidelink grant is automatically selected by the MAC entity of the terminal apparatus may be referred to as the mode 2, and a transmission mode in which the sidelink grant is dynamically allocated by the PDCCH transmitted by the base station apparatus and a transmission mode in which the sidelink grant is semi-persistently configured by through RRC signalling received from the base station apparatus may be referred to as the mode 1.

The present various embodiments will be described based on the foregoing description. Note that, for each of the steps of processing omitted in the following description, each of the steps of processing described above may be applied.

Figure 5:
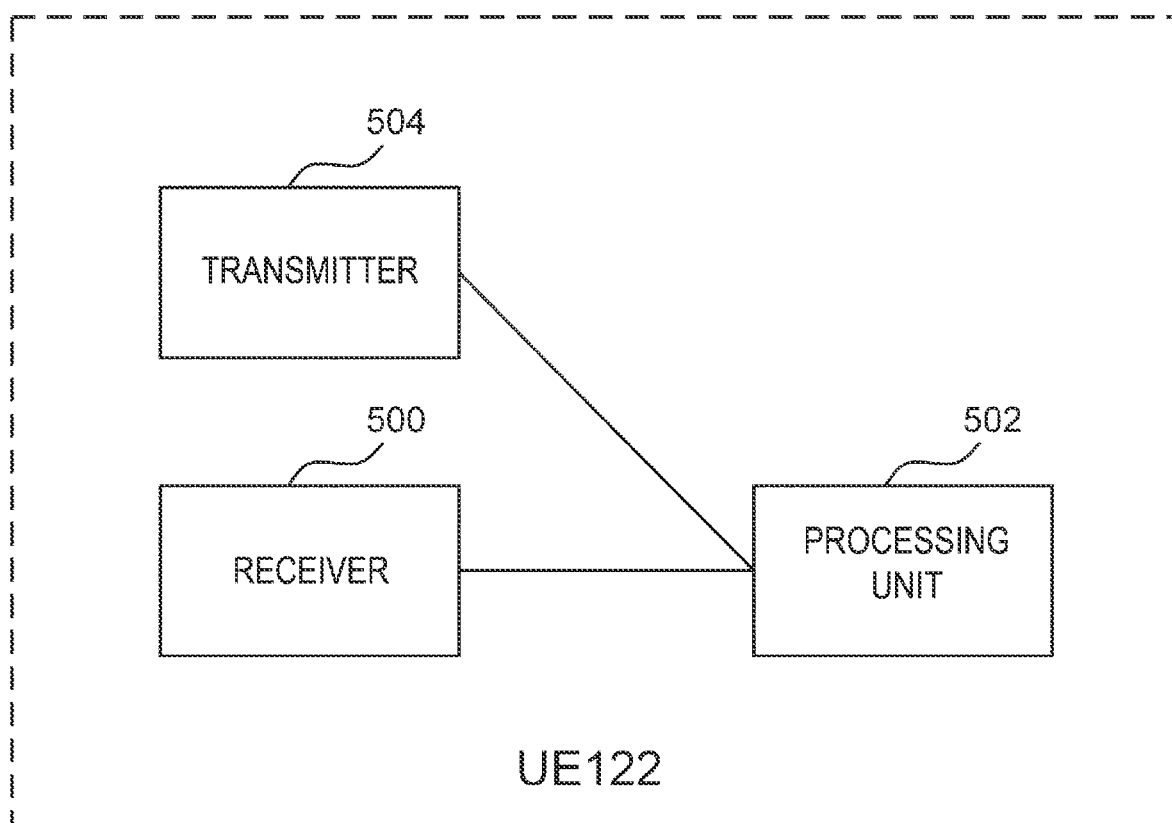
FIG. 5 is a block diagram illustrating a configuration of a terminal apparatus according to the present embodiment.

FIG. 5 is a block diagram illustrating a configuration of the terminal apparatus (UE 122) according to the present embodiment. Note that FIG. 5 illustrates only the main components closely related to the present embodiment in order to avoid complexity of description.

The UE 122 illustrated in FIG. 5 includes a receiver 500 that receives control information (SCI, MAC control elements, RRC signalling, etc.), information including a discovery message and user data, and the like from another terminal apparatus, a processing unit 502 that performs processing according to parameters included in the received control information or the like, and a transmitter 504 that transmits control information (SCI, MAC control elements, RRC signalling, etc.), information including a discovery message and user data, and the like to another terminal apparatus. The processing unit 502 may include some or all of the functions of various layers (for example, the physical layer, the MAC layer, the RLC layer, the PDCP layer, the SRAP layer, the SDAP layer, the RRC layer, the PC5-S layer, the Discovery layer, and the application layer). Specifically, the processing unit 502 may include some or all of a physical layer processing unit (PHY processing unit), a MAC layer processing unit (MAC processing unit), an RLC layer processing unit (RLC processing unit), a PDCP layer processing unit (PDCP processing unit), an SRAP layer processing unit (SRAP processing unit), an SDAP layer processing unit (SDAP processing unit), an RRC layer processing unit (RRC processing unit), a PC5-S layer processing unit (PC5-S processing unit), a Discovery layer processing unit (Discovery processing unit), and an application layer processing unit.

The UE that performs sidelink transmission may transmit the PSCCH and the PSSCH in association with each other. Each PSSCH transmission may be associated with a PSCCH transmission. The PSCCH transmission may carry a first SCI (1st stage of the SCI) associated with the PSSCH transmission, and a second SCI (2nd stage of the SCI) may be carried within resources of the PSSCH. Note that the PSCCH transmission may include the first SCI and the PSSCH transmission may include the second SCI. The PSCCH transmission and the PSSCH transmission may be referred to as sidelink transmission, and the SCI may be sidelink control information. The first SCI may include information in a format referred to as SCI format 1-A and may be used for scheduling the PSSCH and the second SCI on the PSSCH. The SCI format 1-A may include information such as a priority of data, a frequency resource and a time resource on which the PSSCH is transmitted, a resource reservation period, a DMRS mapping pattern, a type of the second SCI, a beta offset indication value, the number of DMRS ports, information indicating a modulation and coding scheme, and other information. The SCI carried on the PSSCH may be the second SCI, and the second SCI may transport sidelink scheduling information and/or inter-UE coordination related information. The second SCI may include information in a format referred to as SCI format 2-A, SCI format 2-B, SCI format 2-C, or the like. The SCI format 2-A, the SCI format 2-B, and the SCI format 2-C may include information such as HARQ process related information, information indicating whether data is new data, a redundancy version, a source ID for identifying a source UE, a destination ID for identifying a destination UE, and information indicating whether HARQ feedback is possible. The SCI format 2-A may additionally include information indicating a cast type and information indicating whether to request Channel State Information (CSI). The SCI format 2-B may additionally include an identifier indicating a zone and request information related to a communication range. The SCI format 2-C may additionally include information indicating whether to request channel state information and information indicating whether to provide or request inter-UE coordination information. In a case that the information providing the inter-UE coordination information is included in the SCI format 2-C, the SCI format 2-C may additionally include information indicating a resource combination, information indicating the first resource location, information indicating a reference slot location, information indicating a resource set type, the lowest subchannel index, and the like. In a case that the information requesting the inter-UE coordination information is included in the SCI format 2-C, the SCI format 2-C may additionally include information such as a priority, the number of subchannels, a resource reservation interval, a resource selection window location, and information indicating a resource set type. Note that each SCI format may include information other than the above-described information.

Next, a procedure for a UE to receive the PSSCH will be described below. The UE, in a case of detecting the SCI format 1-A on the PSCCH, can decode the PSSCH in accordance with the detected SCI format 2-A or SCI format 2-B and the associated PSSCH resource configuration configured by the higher layers. Note that the UE does not need to decode more than one PSCCH in each PSCCH resource candidate. In a case that the UE does not support the modulation and coding scheme indicated by the SCI format 1-A, the UE does not need to decode the PSSCH associated with the corresponding SCI format 2-A and SCI format 2-B, and the SCI format 1-A.

The UE may measure the PSSCH RSRP from the DMRS resource elements for the PSSCH associated with the received SCI format 1-A in a case that the PSSCH is configured in a parameter indicating whether the DMRS used for L1 RSRP measurement during the sensing operation is a DMRS of the PSCCH or a DMRS of the PSSCH in the higher (RRC) layer, and may measure the PSCCH RSRP from the DMRS resource elements for the PSCCH associated with the received SCI format 1-A in a case that the PSCCH is configured.

Figure 8:
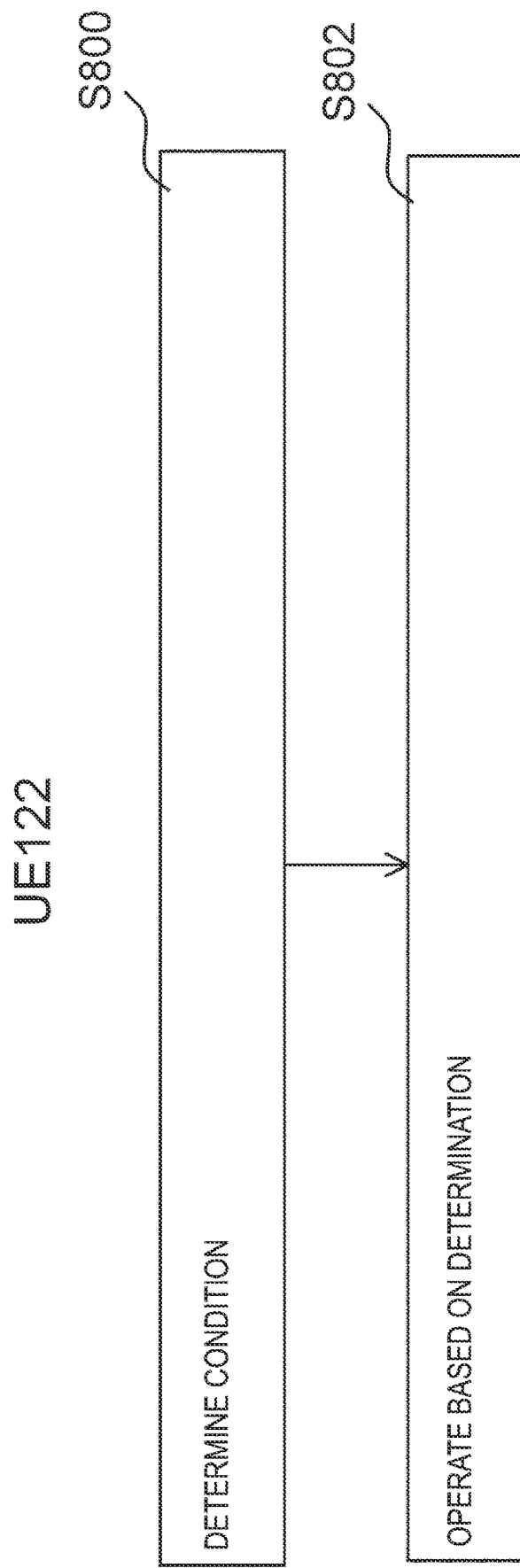
FIG. 8 is an example of processing according to the present embodiment.

An example of an embodiment according to the present invention will be described using FIG. 8.

The UE 122 communicating with the remote UE via the U2U relay UE determines whether a condition is met in step S800 and performs an operation in step S802 based on the determination.

In step S800, the determination on whether the condition is met may be determination on whether at least some or all of the following conditions are met.
(C-1) First information is included in RRC signalling received from the base station apparatus.
(C-2) The first information is included in a system information block (SIB) received from the base station apparatus.
(C-3) The first information is included in PC5-RRC signalling received from the U2U relay UE.
(C-4) The first information is included in PC5-RRC signalling received from the remote UE communicating with the UE 122 via the U2U relay UE.
(C-5) The UE 122 is a UE acting as the U2U remote UE.

The first information may be, for example, information indicating that the L1 RSRP is to be measured in order to detect proximity between the remote UE and the UE 122, information indicating whether the DMRS of the PSSCH or the DMRS of the PSCCH is to be used for the L1 RSRP measurement in order to detect the proximity between the remote UE and the UE 122, or information related to a sidelink configuration used by the U2U relay UE for communication with the remote UE. In (C-3), the first information may be, for example, information indicating that the remote UE is in proximity, or similar information notified from the U2U relay UE as illustrated in the examples of other embodiments. The sidelink configuration may include a configuration for receiving sidelink transmission (e.g., some or all of information related to configuration of sidelink resources used by the remote UE for transmission, information related to configuration of SL DRX used by the relay UE for communication with the remote UE, a cell ID of the remote UE, a cell ID of the relay UE, information related to sidelink transmission resources after the UE-to-UE coordination, etc.).

In a case that the condition is determined to be met in step S800, the operation in step S802 may be to perform some or all of the following operations.
(P-1) To measure the RSRP of the received PSSCH and/or PSCCH.
(P-2) To receive the second SCI corresponding to the first SCI on the received PSCCH.
(P-3) To determine a source ID and/or a destination ID included in the second SCI.
(P-4) To determine whether the source ID is an identifier for identifying the remote UE with which the UE 122 communicates via the U2U relay UE.
(P-5) To determine whether the destination ID is an identifier for identifying the U2U relay UE with which the UE 122 communicates.

In the operation (P-1), in a case that the UE 122 has received the sidelink configuration, the UE 122 may determine the reception resource candidate based on the sidelink configuration. The UE 122 may associate the measured RSRP with the source ID and/or the destination ID determined in the operation (P-3), may associate the measured RSRP with the source ID in a case of determining that the source ID is the identifier for identifying the remote UE with which the UE 122 communicates via the U2U relay UE in the operation (P-4), and may associate the measured RSRP with the source ID and/or the destination ID in a case of determining that the source ID is the identifier for identifying the remote UE with which the UE 122 communicates via the U2U relay UE, and the destination ID is the identifier for identifying the U2U relay UE with which the UE 122 communicates in the operation (P-4) and operation (P-5). The associated source ID and/or destination ID and the measured RSRP may be notified to the higher layer (such as RRC).

Note in a case that the condition is determined to be not met in step S800, the operation in step S802 may be to not perform any or none of the operations (P-1) to (P-5). Note that in an example of the present embodiment, the UE 122 may be a UE acting as a U2U remote UE.

Another example of the embodiment according to the present invention will be described using FIG. 8.

The UE 122 communicating with multiple remote UEs determines whether a condition is met in step S800 and performs an operation in step S802 based on the determination.

In step S800, the determination on whether the condition is met may be determination on whether at least some or all conditions of the following conditions are met.
- (CA-1) Both SL-RSRP-1 and SL-RSRP-2 are equal to or greater than a certain threshold.
- (CA-2) SL-RSRP-1 and SL-RSRP-2 are equal to or greater than the thresholds respectively configured thereto.
- (CA-3) A sum of SL-RSRP-1 and SL-RSRP-2 or another calculated value is equal to or greater than a certain threshold.
- (CA-4) SL-RSRP-1 or SL-RSRP-2 is equal to or greater than a certain threshold.

The SL-RSRP-1 may be an SL-RSRP measured between the source remote UE and the UE 122 configured in U2U relay, for example. The SL-RSRP-2 may be an SL-RSRP measured between the destination remote UE and the UE 122 configured in U2U relay, for example. The SL-RSRP-1 and the SL-RSRP-2 may be measured by the UE 122 or may be measured by each remote UE. In a case that the remote UE measures the SL-RSRP, the remote UE that has measured the SL-RSRP may notify the UE 122 of the measured SL-RSRP. The UE 122 may perform the determination in consideration of parameters such as path loss and transmit power in addition to the SL-RSRP.

In a case that the UE 122 determines that the condition is met in step S800, the operation in step S802 may be, for example, to notify the remote UE of information indicating that the remote UEs are in proximity to each other. The information may be notified to one remote UE, or may be notified to multiple remote UEs. The U2U relay UE may notify the remote UE of the information by transmitting a PC5-RRC message including the information to the remote UE, or by transmitting a MAC CE to the remote UE. The information may be information simply indicating the proximity, may additionally include information capable of identifying a remote UE in proximity, may include information indicating a degree of proximity, and may include the SL-RSRP-1 and/or the SL-RSRP-2. Additionally or alternatively, for example, the UE 122 may transmit information for triggering or determining U2U relay reselection to the one or more remote UEs as an operation in the S802, where the information for triggering or determining the U2U relay reselection may include information indicating that the remote UEs are in proximity to each other, the SL-RSRP-1 and/or the SL-RSRP-2. The information for triggering or determining the U2U relay reselection may include information indicating that the PC5 link with the other remote UE becomes poor, a sidelink radio link failure is detected in the PC5 link with the other remote UE, and the like.

As another example of the operation, in the case that the UE 122 determines that the condition is met in step S800, the operation in step S802 may be, for example, to transmit information for enabling the destination remote UE to detect or receive the PSCCH and the PSSCH transmitted by the source remote UE to the destination remote UE. The information may include, for example, a layer-2 identifier used by the source remote UE for transmission, a candidate resource through which the PSCCH and the PSSCH may be transmitted, or a candidate resource through which the UE 122 may receive the PSCCH and the PSSCH. The layer-2 identifier may be a source identifier and a destination identifier included in the second SCI. In a case that the UE 122 determines in step S800 that the condition is not met, the operation in step S802 may be to not transmit the information to the destination remote UE.

In the case that the UE 122 determines that the condition is not met in step S800, the operation in step S802 may be, for example, to not notify the remote UE of information indicating that the remote UEs are in proximity to each other. In a case that the UE 122 determines that another condition indicating that the remote UEs are not in proximity to each other is met in step S800, the operation in step S802 may be, for example, to not notify information indicating that the remote UEs are in proximity to each other or to notify information indicating that the remote UEs are not in proximity to each other. The other condition may be that both the SL-RSRP-1 and the SL-RSRP-2 are equal to or less than a certain threshold, additionally or alternatively, the condition may be that the SL-RSRP-1 and the SL-RSRP-2 are equal to or less than thresholds respectively configured thereto, and additionally or alternatively, the condition may be that the sum of the SL-RSRP-1 and the SL-RSRP-2 or another calculated value is equal to or less than a certain threshold. Note that in an example of the present embodiment, the UE 122 may be a UE acting as a U2U relay UE, at least one remote UE of the multiple UEs may be a source UE, and the at least one remote UE may be a destination UE.

The information indicating the non-proximity may be notified based on the condition for notifying the non-proximity being met and the information indicating the non-proximity having not been notified since notification of the information indicating the proximity. The information indicating the proximity may be notified in a case that the information indicating the proximity has not been notified since the condition for notifying the proximity has been met.

Another example of the embodiment according to the present invention will be described using FIG. 8.

The UE 122 communicating with the remote UE via the U2U relay UE determines a condition in step S800 and performs an operation in step S802 based on the determination.

The determination of the condition in step S800 may be, for example, determination on whether the first information is received. Receiving the first information may be interchangeably interpreted as other expressions expressing similar functions, such as receiving a PC5-RRC message including the first information. The first information may be, for example, information indicating that the destination remote UE performing communication via the U2U relay UE is in proximity to the UE 122. The first information may be transmitted from the U2U relay UE to the remote UE through a PC5-RRC message, or may be transmitted from the U2U relay UE to the remote UE through a MAC CE. The first information may be information simply indicating the proximity, may additionally include information capable of identifying a destination remote UE, and may include information indicating a degree of proximity.

In a case that the UE 122 determines to receive the first information in step S800, the operation in step S802 may be, for example, to notify the higher layer (such as an application layer) that the destination remote UE is in proximity. The notification to the higher layer may be information indicating that direct communication with the destination remote UE is possible, or other information indicating similar information. The notification to the to the higher layer may include information capable of identifying the destination remote UE. Additionally or alternatively, the operation in step S802 may be, for example, to perform the discovery procedure. Additionally or alternatively, the operation in step S802 may be, for example, to initiate a U2U relay reselection procedure. Note that in an example of the present embodiment, the UE 122 may be a UE acting as a U2U remote UE.

Another example of the embodiment according to the present invention will be described using FIG. 8.

The UE 122 communicating with the remote UE via the U2U relay UE determines a condition in step S800 and performs an operation in step S802 based on the determination.

The determination of the condition in step S800 may be, for example, determination on, in a case that the UE 122 receives the second SCI included in the PSSCH corresponding to the transmission from the remote UE to the U2U relay UE, whether the SL-RSRP corresponding to the received second SCI is equal to or greater than a threshold. The UE 122 may measure the SL-RSRP using the PSCCH associated with the second SCI or using the PSSCH. In a case that the UE 122 determines that the condition is met in step S800, the operation in step S802 may be, for example, to notify the higher layer (such as an application layer) that the remote UE is in proximity, additionally or alternatively, to notify the remote UE that the remote UE is in proximity, additionally or alternatively, to initiate the U2U relay reselection procedure, or additionally or alternatively, to perform the discovery procedure to communicate directly with the remote UE. The remote UE being in proximity may be interchangeably interpreted as direct communication with the remote UE being possible, and instead of notifying the remote UE that the remote UE is in proximity, the UE 122 may notify other information (for example, information indicating that the U2U relay reselection procedure is to be initiated, the discovery procedure is to be performed in order to perform direct communication with the remote UE, etc.). In the case that the condition is determined to be not met in step S800, the operation in step S802 may be, for example, to not notify the higher layer (such as an application layer) that the remote UE is in proximity, to not notify the remote UE that the remote UE is in proximity, to not initiate the U2U relay reselection procedure, or to not perform the discovery procedure to communicate directly with the remote UE.

As another example, the determination of the condition in S800 may be, for example, determination on whether a condition is met that the SL-RSRP measured by the UE 122 in sidelink communication between the UE 122 and the U2U relay UE is equal to or greater than a threshold, and/or that the information indicating that the UE 122 and the U2U relay UE are in proximity is received from the U2U relay UE. In the case that the condition is determined to be met in step S800, the operation in step S802 may be, for example, to transmit the SL-RSRP to the remote UE via the U2U relay UE, or to transmit information indicating that the UE 122 and the U2U relay UE are in proximity to the remote UE. In the case that the condition is determined to not be met in step S800, the operation in step S802 may be, for example, to not transmit the SL-RSRP and the information indicating that the UE 122 and the U2U relay UE are proximity to the remote UE via the U2U relay UE. The remote UE receiving the SL-RSRP from the UE 122 may determine whether the UE 122 and the remote UE are in proximity from both the SL-RSRP (SL-RSRP-1) received from the UE 122 and the SL-RSRP (SL-RSRP-2) measured between the remote UE and the U2U relay UE, and may notify the higher layer (such as an application layer) of the remote UE that the remote UE is proximity in a case of determining that the UE 122 and the remote UE are proximity. Note that the UE 122 may be a UE acting as a U2U remote UE.

Another example of the embodiment according to the present invention will be described using FIG. 8.

The UE 122 communicating with multiple remote UEs determines a condition in step S800 and performs an operation in step S802 based on the determination.

The determination of the condition in step S800 may be, for example, determination on whether at least some or all of the following conditions are met.
 (CB-1) The UE 122 itself acts as a U2U relay UE.
 (CB-2) In communication with the source remote UE, sidelink discontinuous reception (SL DRX) is configured for the UE 122.
 (CB-3) Some or all of the conditions (CA-1) to (CA-4) are met.

In a case that the UE 122 determines that the condition is met in step S800, the operation in step S802 may be, for example, to transmit to the destination remote UE a sidelink reception configuration configured between the UE 122 and the source remote UE. The sidelink reception configuration may include a part or all of information such as information related to sidelink resources, information related to SL DRX configuration, information related to inter-UE coordination, source ID, destination ID, and the like.

The remote UE receiving the sidelink reception configuration may operate in consideration of the sidelink reception configuration. For example, in a case that the received sidelink reception configuration includes information related to the SL DRX configuration, the remote UE may perform SL DRX in consideration of the SL DRX configuration or may determine the active time of SL DRX. For example, in a case that the received sidelink reception configuration includes information related to the resources, the remote UE may use the information on the resources for configuration of a reception resource, and may also notify the lower layer (such as MAC, PHY, or the like) of information including information such as the source ID and/or the destination ID. Note that the UE 122 may be a UE acting as a U2U relay UE, at least one remote UE of the multiple remote UEs may be a source remote UE, and the at least one remote UE may be a destination remote UE.

Another example of the embodiment according to the present invention will be described using FIG. 8.

The UE 122 communicating with multiple remote UEs determines a condition in step S800 and performs an operation in step S802 based on the determination.

The determination of the condition in step S800 may be, for example, determination on whether at least some or all of the following conditions are met.
 (CC-1) The UE 122 itself acts as a U2U relay UE.
 (CC-2) The sidelink reception configuration is received from the destination remote UE.
 (CC-3) Some or all of the conditions (CA-1) to (CA-4) are met.

The UE 122 may determine to receive the sidelink reception configuration from the destination remote UE by receiving the SL DRX configuration of the destination remote UE from the destination remote UE. The sidelink reception configuration may include a part or all of information such as information related to sidelink resources, information related to SL DRX configuration, information related to inter-UE coordination, source ID, destination ID, and the like. In a case that the UE 122 determines that the condition is met in step S800, the operation in step S802 may be, for example, to transmit the sidelink reception configuration to the source remote UE.

Note that the source remote UE receiving the sidelink reception configuration may operate in consideration of the sidelink reception configuration. For example, the source remote UE may select the transmission resource in consideration of the active time determined by the SL DRX configuration in a case that the received sidelink reception configuration includes the information related to the SL DRX configuration, may determine the transmission resource in consideration of the information related to the inter-UE coordination in a case that the received sidelink reception configuration includes the information related to the inter-UE coordination, and may determine the transmission resource in consideration of the information related to the sidelink resource in a case that the received sidelink reception configuration includes the information related to the sidelink resource. Note that the UE 122 may be a UE acting as a U2U relay UE, at least one remote UE of the multiple remote UEs may be a source remote UE, and the at least one remote UE may be a destination remote UE.

Another example of the embodiment according to the present invention will be described using FIG. 8.

The UE 122 communicating with the remote UE via the U2U relay UE determines a condition in step S800 and performs an operation in step S802 based on the determination.

The determination of the condition in step S800 may be, for example, determination on whether at least some or all of the following conditions are met.

(CD-1) The UE 122 itself acts as a U2U remote UE.
(CD-2) The sidelink discontinuous reception (SL DRX) is configured for the UE 122.
(CD-3) The proximity between the remote UEs is notified by the U2U relay UE.

In a case that the UE 122 determines that the condition is met in step S800, the operation in step S802 may be, for example, that the UE 122 transmits the sidelink reception configuration configured for the UE 122 itself to the remote UE, or that the UE 122 notifies the U2U relay UE and/or the remote UE of the SL-RSRP measured in communication with the U2U relay UE. The sidelink reception configuration may include a part or all of information such as information related to sidelink resources, information related to SL DRX configuration, information related to inter-UE coordination, source ID, destination ID, and the like.

Note that the remote UE receiving the sidelink reception configuration may operate in consideration of the sidelink reception configuration. For example, the remote UE may select the transmission resource in consideration of the active time determined by the SL DRX configuration in a case that the received sidelink reception configuration includes the information related to the SL DRX configuration, may determine the transmission resource in consideration of the information related to the inter-UE coordination in a case that the received sidelink reception configuration includes the information related to the inter-UE coordination, and may determine the transmission resource in consideration of the information related to the sidelink resource in a case that the received sidelink reception configuration includes the information related to the sidelink resource. Note that the UE 122 may be a UE acting as a U2U remote UE.

Note that in examples of the embodiments, the discovery procedure may be a discovery procedure in an AS layer, and the discovery procedure in the AS layer may be a procedure of configuring a lower layer (such as PHY) to monitor SCI and corresponding data using a resource pool according to a configuration configured for the UE for receiving a discovery message, or a procedure of configuring a lower layer (such as PHY) to perform a resource allocation mode 1 or a resource allocation mode 2 using a resource pool according to a configuration configured for the UE for transmitting a discovery message. In the examples of the embodiments, the U2U relay reselection may be a procedure of reselecting the U2U relay UE, may include a discovery procedure, or may include a discovery procedure for directly discovering a destination UE. In the examples of the embodiments, a condition that A is equal to or greater than B may be replaced with a condition that A is greater than B, and similarly, a condition that A is equal to or smaller than B may be replaced with a condition that A is smaller than B. Note that, in the examples of the embodiments, the sidelink reception configuration and the configuration for receiving the sidelink transmission may be interchangeably interpreted. In the examples of the embodiments, the sidelink transmission may be transmitting a signal and/or data through a physical channel (such as PSSCH or PSCCH), and the sidelink reception may be receiving a signal and/or data through a physical channel (such as PSSCH or PSCCH).

Note that in the examples of the embodiments, the threshold used for the determination may be configured through dedicated signalling or system information (SI) from the network or the base station apparatus, or may be preconfigured in a case that the threshold is not configured by the network or the base station apparatus, or in a case that the configuration cannot be used. Note that an offset value may be applied to the threshold, or a value measured by the UE may be applied to the threshold. In the examples of the embodiments, the UE may, besides the link to a UE communicating in the U2U relay, communicate with the base station apparatus through a link via the Uu, perform sidelink communication with another UE, or have other links. In the examples of the embodiments, the determined condition is at least the considered condition, and other conditions may be used for the determination. In the examples of the embodiments, the above-described operation may be performed regardless of the result of the above-described determination. In the examples of the embodiments, the UE may transmit certain information to the base station apparatus instead of notifying a higher layer (such as an application layer) of the certain information. Transmitting to the base station apparatus may be replaced with other expressions having a similar function.

Note that the embodiments may be combined with each other, and an embodiment obtained by combining the embodiments is also included in the technical scope of the present invention.

In 3GPP, a U2U relay in which UEs communicate with each other via a relay UE has been studied. However, in some cases, it may be better for UEs to directly communicate with each other without via a relay UE. According to the present invention, in the U2U relay, by determining whether the U2U relay is an appropriate link in consideration of proximity to a UE communicating indirectly via a relay UE, radio resources can be efficiently used, and signalling can be reduced.

In the above description, expressions such as "notified," "indicated," and the like may be interchangeably interpreted.

In the above description, expressions such as "linked," "mapped," and "associated" may be interchangeably interpreted.

In the above description, expressions such as "included," "being included," and "have been included" may be interchangeably interpreted.

In the above description, "the" may be rephrased as "the above-described".

In the above description, expressions such as "set to," "configured to," and "included" may be interchangeably interpreted.

In the example of each processing or the example of the flow of each processing in the above description, a part or all of the steps may not be performed. In the example of each processing or the example of the flow of each processing in the above description, order of the steps may be different. In the example of each processing or the example of the flow of each processing in the above description, a part or all of the processing in each step may not be performed. In the example of each processing or the example of the flow of each processing in the above description, order of processing in each step may be different. In the above description, "to perform B based on satisfaction of A" may be interpreted as "to perform B". In other words, "to perform B" may be performed independently of "satisfaction of A".

Note that in the above description, "A may be interpreted as B" may include the meaning that B is interpreted as A in addition to interpretation of A as B. In a case that the above description contains "C may be D" and "C may be E," this may mean inclusion of "D may be E." In a case that the above description contains "F may be G" and "G may be H," this may mean inclusion of "F may be H."

In the above description, in a case that a condition "A" and a condition "B" are conflicting conditions, the condition "B" may be expressed as "other" condition of the condition "A".

A program running on an apparatus according to the present embodiments may serve as a program that controls a Central Processing Unit (CPU) and the like to cause a computer to operate in such a manner as to realize the functions of the present embodiment. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiments may be partially enabled by a computer. In such a case, a program for implementing such control functions may be recorded on a computer-readable recording medium to cause a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the present embodiment is not limited to the above-described embodiments. Although apparatuses have been described as an example in the embodiments, the present embodiments are not limited to these apparatuses, and are applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although the embodiments have been described in detail above referring to the drawings, the specific configuration is not limited to the embodiments and includes, for example, design changes within the scope that does not depart from the gist of the embodiments. Furthermore, various modifications are possible within the scope of the present embodiments defined by claims, and embodiments that are made by suitably combining technical means disclosed according to the different embodiments are also included in the technical scope of the present embodiment. A configuration in which components, which are described in the embodiments described above, having similar effects are interchanged is also included in the present invention.

REFERENCE SIGNS LIST 100 ng-eNB
102 gNB
110, 112, 114 Interface
122 UE
200 PHY
202 MAC
204 RLC
206 PDCP
208 RRC
210 PC5-S
310 SDAP
400 Discovery
500 Receiver
502 Processing unit
504 Transmitter
600 SRAP

The invention claimed is:

1. A third terminal apparatus for communicating with a first terminal apparatus and a second terminal apparatus, the third terminal apparatus being responsible to relay communication between the first terminal apparatus and the second terminal apparatus, the third terminal apparatus comprising:
a processing unit configured to measure a sidelink Reference Signal Received Power (SL-RSRP) in each of communication with the first terminal apparatus and communication with the second terminal apparatus; and
a transmitter, wherein
the processing unit determines whether the two SL-RSRPs are equal to or greater than a threshold, and notifies the first terminal apparatus that the first terminal apparatus and the second terminal apparatus are in proximity to each other in a case that the two SL-RSRPs are determined to be equal to or greater than the threshold, and does not notify the first terminal apparatus that the first terminal apparatus and the second terminal apparatus are in proximity to each other in a case that the two SL-RSRPs are not determined to be equal to or greater than the threshold.

2. A method for a third terminal apparatus for communicating with a first terminal apparatus and a second terminal apparatus, the third terminal apparatus being responsible to relay communication between the first terminal apparatus and the second terminal apparatus, the method comprising:
measuring a sidelink Reference Signal Received Power (SL-RSRP) in each of communication with the first terminal apparatus and communication with the second terminal apparatus; and
determining whether the two SL-RSRPs are equal to or greater than a threshold, and notifying the first terminal apparatus that the first terminal apparatus and the second terminal apparatus are in proximity to each other in a case that the two SL-RSRPs are determined to be equal to or greater than the threshold, and not notifying the first terminal apparatus that the first terminal apparatus and the second terminal apparatus are in proximity to each other in a case that the two SL-RSRPs are not determined to be equal to or greater than the threshold.

3. An integrated circuit mounted on a third terminal apparatus for communicating with a first terminal apparatus and a second terminal apparatus, the third terminal apparatus being responsible to relay communication between the first terminal apparatus and the second terminal apparatus, the integrated circuit performing:
measuring a sidelink Reference Signal Received Power (SL-RSRP) in each of communication with the first terminal apparatus and communication with the second terminal apparatus; and
determining whether the two SL-RSRPs are equal to or greater than a threshold, and notifying the first terminal apparatus that the first terminal apparatus and the second terminal apparatus are in proximity to each other in a case that the two SL-RSRPs are determined to be equal to or greater than the threshold, and not notifying the first terminal apparatus that the first terminal apparatus and the second terminal apparatus are in proximity to each other in a case that the two SL-RSRPs are not determined to be equal to or greater than the threshold.

* * * * *